US010456780B1

(12) United States Patent
Al-Sulaiman et al.

(10) Patent No.: US 10,456,780 B1
(45) Date of Patent: Oct. 29, 2019

(54) ENERGY EFFICIENT HUMIDIFICATION-DEHUMIDIFICATION DESALINATION SYSTEM

(71) Applicant: King Fahd University of Petroleum and Minerals, Dhahran (SA)

(72) Inventors: Fahad A. Al-Sulaiman, Dhahran (SA); Haris Shahzad, Dhahran (SA); Hafiz Muhammad Abd-Ur-Rehman, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 7 days.

(21) Appl. No.: 15/975,044

(22) Filed: May 9, 2018

(51) Int. Cl.
| | |
|---|---|
| *B01D 3/18* | (2006.01) |
| *B01D 1/00* | (2006.01) |
| *B01D 1/26* | (2006.01) |
| *C02F 1/04* | (2006.01) |
| *C02F 1/10* | (2006.01) |
| *C02F 1/14* | (2006.01) |
| *B01L 3/18* | (2006.01) |
| *C02F 103/08* | (2006.01) |

(52) U.S. Cl.
CPC ............. *B01L 3/18* (2013.01); *B01D 1/0035* (2013.01); *B01D 1/26* (2013.01); *C02F 1/043* (2013.01); *C02F 1/10* (2013.01); *C02F 1/14* (2013.01); *C02F 2103/08* (2013.01)

(58) Field of Classification Search
CPC .......... B01D 1/0035; B01D 1/26; B01D 3/18; C02F 1/043; C02F 1/10; C02F 1/14
See application file for complete search history.

(56) References Cited

U.S. PATENT DOCUMENTS

| | | | |
|---|---|---|---|
| 9,320,984 B2 | 4/2016 | Govindan et al. | |
| 9,643,102 B2 | 5/2017 | Al-Sulaiman et al. | |
| 9,745,208 B2 | 8/2017 | Al-Gutub et al. | |
| 2015/0353377 A1* | 12/2015 | Al-Sulaiman | C02F 1/043 261/127 |
| 2016/0339356 A1 | 11/2016 | Govindan et al. | |

OTHER PUBLICATIONS

Abd-Ur-Rehman, et al. ; A novel design of a multistage stepped bubble col. humidifier for the humidification of air; Apr. 7, 2017 ; pp. 1-7.

* cited by examiner

Primary Examiner — Brian A McCaig
(74) Attorney, Agent, or Firm — Oblon, McClelland, Maier & Neustadt, L.L.P.

(57) ABSTRACT

The present disclosure relates to a humidification-dehumidification desalination system. A humidification subsystem of the humidification-dehumidification desalination system includes a thermal element and a bubble column, in series. The thermal element further comprises a thermal energy storage unit including a phase change material and a thermal conductor. The thermal element can be supplemented by a Fresnel lens canopy. The thermal element and the bubble column of the humidification design are arranged in staircase design such that gravity drives the system.

20 Claims, 17 Drawing Sheets

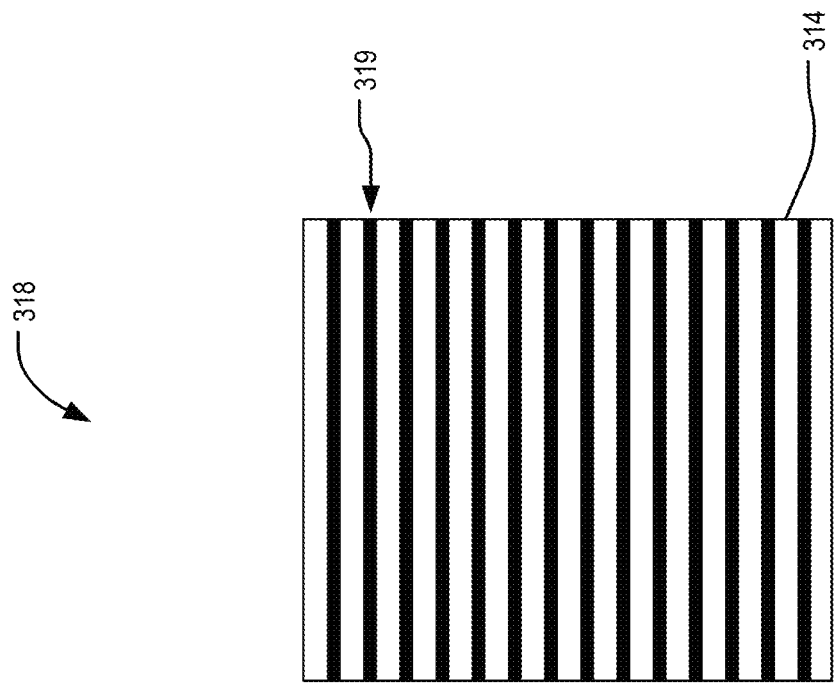
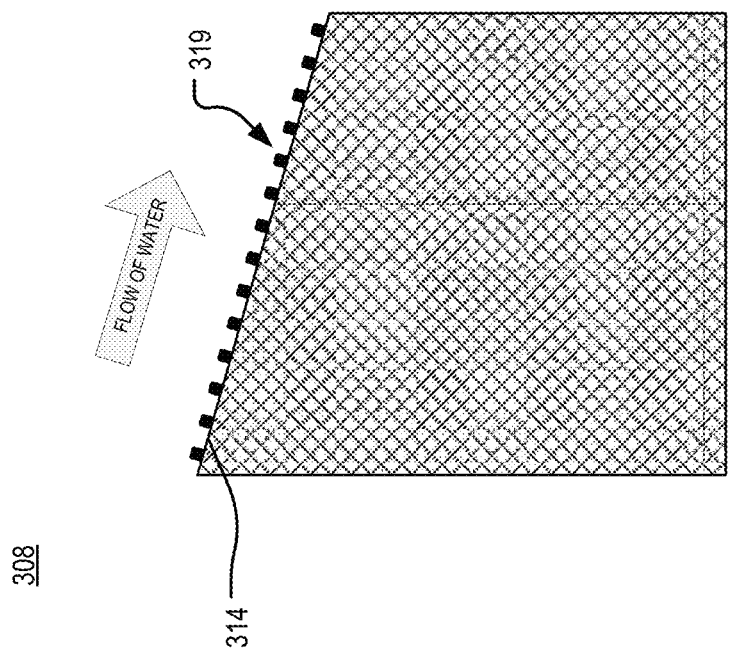
FIG. 3B
FIG. 3A

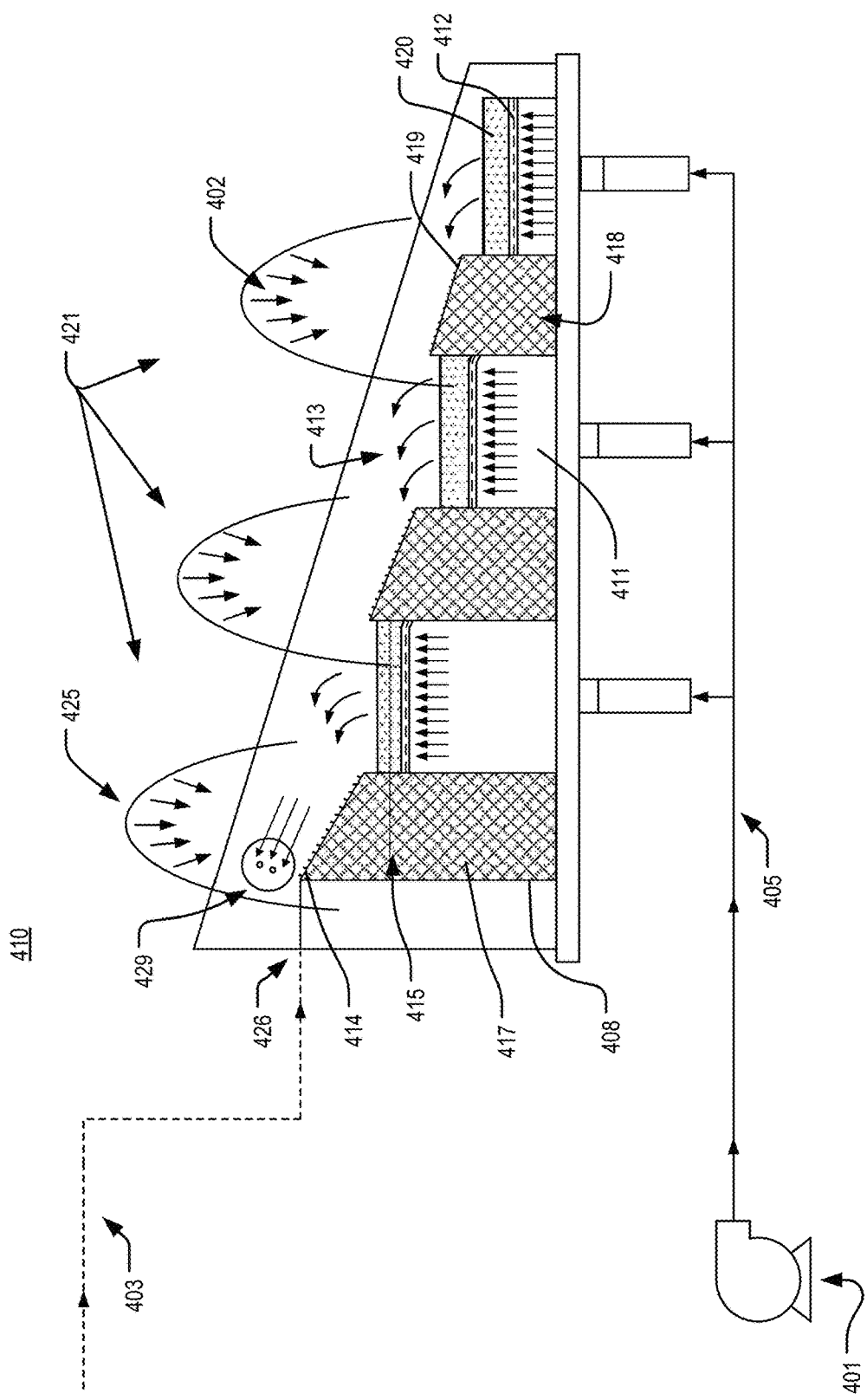

ENERGY EFFICIENT HUMIDIFICATION-DEHUMIDIFICATION DESALINATION SYSTEM

BACKGROUND

Field of the Disclosure

The present invention relates to desalination and distillation systems, and particularly to a humidification-dehumidification system that may be used for desalination of salinous water and various other uses where it is desired to purify water or separate mixtures.

Description of the Related Art

In many areas of the world, fresh water is scarce, but water of varying salt concentrations, referred to herein as salinous water, is abundant. Salinous water describes water with a salt concentration, or salinity, greater than that of fresh water (<0.05% w/v), including but not limited to brackish water (0.05-3% w/v), saline (3-5% w/v), and brine (>5% w/v). Salt includes all forms of dissolved minerals including sodium chloride and calcium carbonate, such as salts of the alkali metals, alkaline earth metals, transition metals and main group metals. The abundance of salinous water, and lack of fresh water, has led to the development of various desalination systems to remove salts, primarily sodium chloride, from salinous water, both for drinking water and to produce less corrosive water for industrial use.

Conventional distillation with a single heating stage and a single condensation stage is not energy efficient and is cost prohibitive. As a result, various desalination technologies have been developed. One widely used desalination technology is multi-stage flash (MSF) distillation, in which vapor is produced by the sudden inrush of salinous water in an evacuated chamber (flashing), followed by condensation of the vapor to obtain fresh water, a process that is repeated sequentially in multiple stages or chambers. Another widely used desalination technology is reverse osmosis (RO), in which pumps are used to drive the seawater or brine feed through a selectively permeable ion exchange membrane. Several other processes are known, including electrodialysis, thermal vapor compression, liquid-liquid extraction, etc. However, each of these processes is expensive, and they each have technical limitations.

More recently, there has been interest in humidification-dehumidification (HDH) desalination technology, in which a carrier gas, or air stream, is humidified with the salinous water, and then dehumidified to obtain fresh water. Such systems are small-scale distillation systems, in high demand for providing a decentralized supply of fresh water to remote areas, which may make use of solar energy during the humidification stage. Such systems are usually more economical than other desalination technologies, but are often less energy efficient.

There are many devices which can be used for the humidification of a carrier gas, including the spray tower, wetted-wall tower, packed-bed tower, and the bubble column. The bubble column is an innovative design of a humidification device in which air is passed through a perforated plate to form bubbles in a hot water column. As the air bubbles move through the hot water column, heat and mass transfer take place simultaneously, providing an advantage over other approaches. The use of bubble columns in HDH, however, has been limited to single stage designs in which the water and air streams are homogeneously mixed in the bubble column and large temperature differences increase irreversibility in the system.

In an effort to increase energy efficiency, HDH designs employing multiple stages have been introduced, aiming, in part, to increase absolute humidity. Further, these designs often incorporate a single heatable surface across which a thin layer of salinous water is passed prior to introduction to the bubble columns. By adjusting the heatable surface according to the direction of solar energy, and passing the salinous water over the heatable surface, the temperature of the salinous water can be increased prior to introduction to the multi-stage bubble columns. Additional improvements in energy usage and energy recycling, however, including considerations of solar energy lost from the heatable surface as waste heat, are critical to the economic feasibility of these systems and highlight a continuing need to increase energy efficiency, reduce costs, and increase productivity. Thus, a humidification-dehumidification desalination system addressing the aforementioned problems and voids is desired.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to a humidification-dehumidification desalination system, comprising a humidifier, comprising a housing having a sloped roof, a fluid inlet, and a fluid outlet, at least one thermal element for heating a fluid to be purified disposed within the housing, the at least one thermal element having a surface sloped at a pre-determined angle, at least one fluid tray disposed within the housing, the at least one fluid tray being adapted for containing the fluid to be purified and having a floor incorporating a bubble generator therein, wherein the bubble generator is in fluid communication with an air stream, and a dehumidifier, wherein the surface of the at least one thermal element, sloped at the pre-determined angle, is optically aligned with an at least one solar energy concentrator, wherein the fluid inlet is configured to introduce a fluid to be purified to the at least one thermal element, wherein the at least one thermal element is configured to introduce the fluid to be purified to the at least one fluid tray at a pre-determined temperature.

The present disclosure further relates to the humidification-dehumidification desalination system described above, wherein the at least one thermal element further comprises one or more heat absorbing pipes, one or more heat absorbing plates, one or more thermal energy storage units, or a combination thereof.

The present disclosure further relates to the humidification-dehumidification desalination system described above, wherein the one or more thermal energy storage units comprise a phase change material.

The present disclosure further relates to the humidification-dehumidification desalination system described above, wherein the one or more thermal energy storage units further comprise a thermal conductor embedded within the phase change material.

The present disclosure further relates to the humidification-dehumidification desalination system described above, wherein the thermal conductor is a metallic mesh.

The present disclosure further relates to the humidification-dehumidification desalination system described above, wherein one or more levees are disposed on a surface of the one or more heat absorbing plates.

The present disclosure further relates to the humidification-dehumidification desalination system described above, wherein the one or more levees are of a cross-sectional shape including a rectangle, a hemisphere, a sphere, a triangle, a square, or a combination thereof.

The present disclosure further relates to the humidification-dehumidification desalination system described above, wherein the one or more levees are continuous, discontinuous, or a combination thereof, across a dimension of the surface of the one or more heat absorbing plates.

The present disclosure further relates to the humidification-dehumidification desalination system described above, wherein the at least one solar energy concentrator is a Fresnel lens canopy.

The present disclosure further relates to the humidification-dehumidification desalination system described above, wherein the at least one thermal element is adjacent to the at least one fluid tray, the at least one thermal element arranged to passively introduce the fluid to the at least one fluid tray.

The present disclosure further relates to a humidification-dehumidification desalination system, comprising a humidifier, comprising a housing having a sloped roof, a fluid inlet, and a fluid outlet, a plurality of stepped thermal elements for heating a fluid to be purified disposed within the housing, the plurality of stepped thermal elements having a surface sloped at a pre-determined angle, a plurality of stepped fluid trays disposed within the housing, the plurality of stepped fluid trays being adapted for containing the fluid to be purified and having a floor incorporating a bubble generator therein, wherein the bubble generator is in fluid communication with an air stream, and a dehumidifier, wherein the surface of the plurality of stepped thermal elements, sloped at the pre-determined angle, is optically aligned with an at least one solar energy concentrator, wherein the fluid inlet is configured to introduce a fluid to be purified to a first thermal element of the plurality of stepped thermal elements, wherein the plurality of stepped thermal elements are configured to introduce the fluid to be purified to the plurality of stepped fluid trays at a pre-determined temperature, wherein the plurality of stepped thermal elements and the plurality of stepped fluid trays alternate successively, ranging from an uppermost thermal element to a lowermost fluid tray, each successively lower thermal element or fluid tray receiving spillover from the thermal element or fluid tray immediately above.

The present disclosure further relates to the humidification-dehumidification desalination system described above, wherein each of the plurality of stepped thermal elements further comprises one or more heat absorbing pipes, one or more heat absorbing plates, one or more thermal energy storage units, or a combination thereof.

The present disclosure further relates to the humidification-dehumidification desalination system described above, wherein the one or more thermal energy storage units comprise a phase change material.

The present disclosure further relates to the humidification-dehumidification desalination system described above, wherein the one or more thermal energy storage units further comprise a thermal conductor embedded within the phase change material.

The present disclosure further relates to the humidification-dehumidification desalination system described above, wherein the thermal conductor is a metallic mesh.

The present disclosure further relates to the humidification-dehumidification desalination system described above, wherein one or more levees are disposed on a surface of the one or more heat absorbing plates.

The present disclosure further relates to the humidification-dehumidification desalination system described above, wherein the one or more levees are of a cross-sectional shape including a rectangle, a hemisphere, a sphere, a triangle, a square, or a combination thereof.

The present disclosure further relates to the humidification-dehumidification desalination system described above, wherein the one or more levees are continuous, discontinuous, or a combination thereof, across a dimension of the surface of the one or more heat absorbing plates.

The present disclosure further relates to the humidification-dehumidification desalination system described above, wherein the at least one solar energy concentrator is a Fresnel lens canopy.

The present disclosure further relates to the humidification-dehumidification desalination system described above, wherein each successively lower thermal element or fluid tray passively receives spillover from the thermal element or fluid tray immediately above.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3A is a lateral view of a thermal element, according to an exemplary embodiment of the present disclosure;

FIG. 3B is a superficial view of a thermal element, according to an exemplary embodiment of the present disclosure;

FIG. 4 is a schematic of a humidification subsystem, according to an exemplary embodiment of the present disclosure;

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The nexus of water, food, and energy are interconnected issues that reflect all human activities on Earth. Therefore, the scarcity of fresh water, the apprehensions of food crises, and sustainability concerns of conventional energy sources are the most intimidating issues for mankind. The problem is exacerbated in electricity-scarce, remote communities where high population growth has resulted in increases in water demand and fears of agricultural insufficiencies. Therefore, it is highly desirable to develop a decentralized system to alleviate concerns over access to clean water, adequate food production, and availability of sustainable energy for remote communities.

Humidification-dehumidification (HDH) has been a central focus of efforts in this area due to its functional simplicity, utilization of waste heat resources, consumption of low grade energy, usage of low cost construction materials, and moderate investment. Early work, however, recognized lowered efficiency of HDH due to the presence of non-condensable gases, a derivative of high irreversibility caused by large temperature differences within the system. In response, recent efforts have employed multi-stage designs that reduce the temperature differences between segments of the system.

Figure 1:
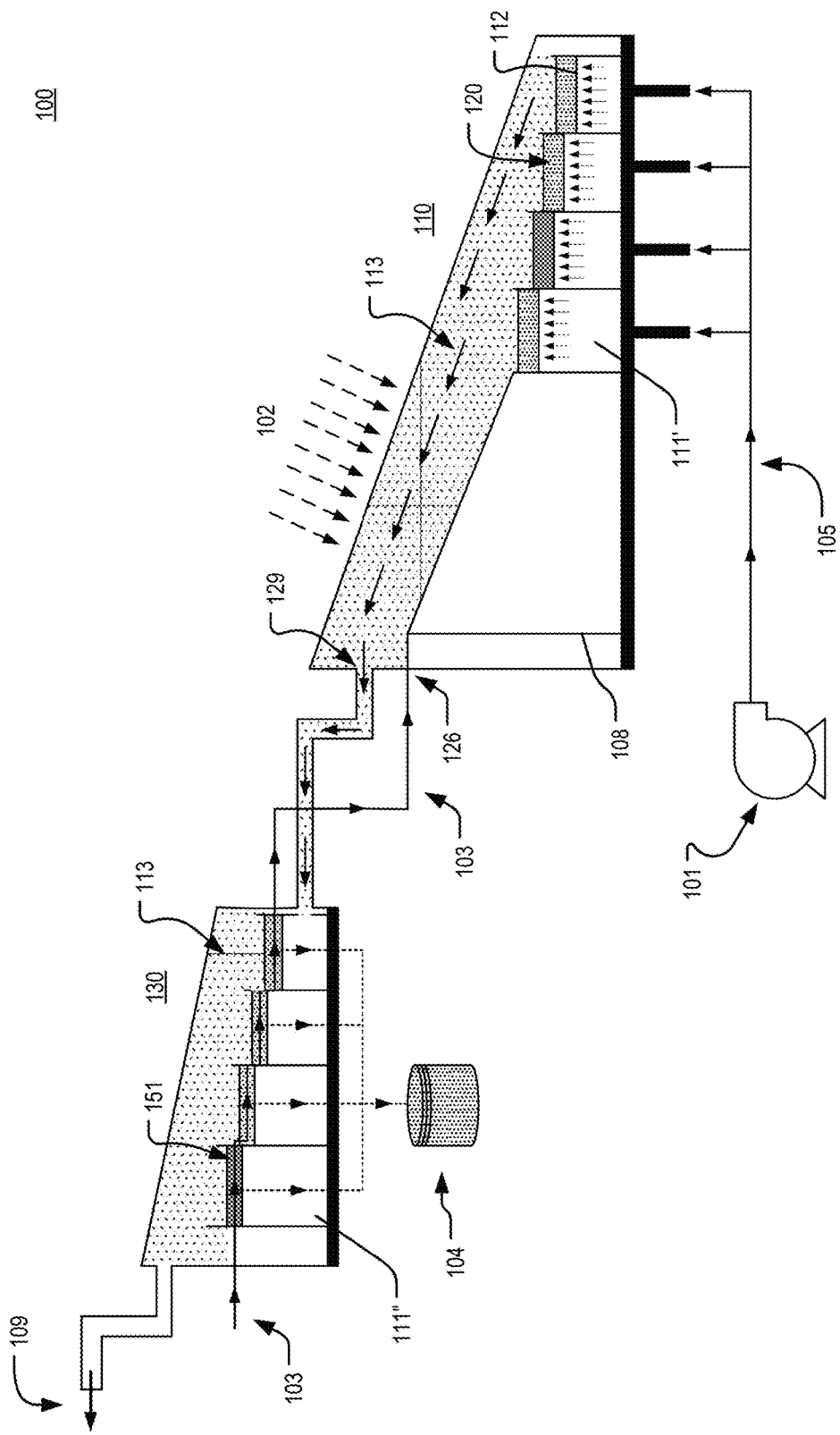
FIG. 1 is an adapted schematic of a humidification-dehumidification system design.

FIG. 1 is an adapted schematic of a humidification-dehumidification system 100 design. In FIG. 1, a thermal element 108 and a plurality of bubble columns 111' are incorporated in a single frame design. A sloped surface of the thermal element 108 is titled to an angle equal to the geographic latitude to absorb maximum solar energy 102. Moreover, the sloped surface of the thermal element 108 acts as an inclined surface such that salinous water 103 entering the humidification subsystem 110 via a fluid inlet 126 is dispersed into a thin film of salinous water as it passes over the surface of the thermal element 108. Solar energy 102 heats the salinous water 103 as it passes over the surface of the thermal element 108, wherein the minimal depth of the salinous water 103 as it passes over the surface of the thermal element 108 allows for heat transfer from the solar energy 102 to the salinous water 103 and, consequently, a elevated water temperature at exit. In this configuration, the salinous water 103 is heated via radiation (102) and convection from humidified air, however, a portion of the solar energy 102 entering the humidification subsystem 110 is lost. The heated salinous water 103 then passes over the stepped configuration of bubble columns 111'. Each bubble column 111' is equipped with control valves that maintain salinous water 103 at different heights in the fluid tray 120 and can be connected to the next stage or can be drained outside the humidification subsystem 110. In an example, control valves are opened at the desired salinous water column height in the fluid tray 120 in order to pass the salinous water to the subsequent bubble column. Alternatively, salinous water column height in each fluid tray 120 of each bubble column 111' can be controlled by spill over from the adjacent, upstream bubble column 111'.

Each bubble column 111' receives an air stream 105 supplied by a blower 101. As the air stream 105 is delivered into each bubble column 111' it passes through a perforated plate 112. As the air stream 105 passes through the perforated plate 112 and enters the salinous water column of the fluid tray 120, the relatively cooler air stream 105 harvests energy from the heated salinous water 103 as it becomes the humidified air 113 stream.

This multi-stage stepped humidifier approach includes a plurality of bubble columns 111' allowing for mixing of the air stream 105 and salinous water 103, thereby minimizing the difference in temperature from one stage to the next. Consequently, the air stream 105 in each stage is heated and leaves the humidifier via fluid outlet 129 at a temperature similar to the water inlet temperature. Compared to single-stage approaches, the multi-stage stepped approach aids in attaining a higher absolute humidity by heating and humidifying the air stream 105 through its full path 113 inside the humidifier.

As the humidified air 113 exits the humidification subsystem 110, it enters the dehumidification subsystem 130. The dehumidification subsystem 130 is a multi-stage stepped configuration in order to minimize the temperature difference between subsequent columns and to lower entropy generation. As humidified air 113 enters the dehumidification subsystem 130, the humidified air 113 is sparged through the bubble columns 111", thereby condensing the humidified air 113 within the bubble column 111" and mitigating non-condensable gases. Concurrently, as seen in FIG. 1, salinous water 103 entering the dehumidification subsystem 130 is passed through a dehumidifier tray 151 of the bubble column 111" via conduit in order to acquire latent heat of condensation and heat the salinous water 103 prior to introduction to the humidification subsystem 110. Condensed humidified air 113 can be passed via conduit to a condensate tank 104. Uncondensed humidified air 113 can be passed via a dehumidification subsystem output 109 to a subsequent subsystem, including but not limited to a passive condenser, for further utilization.

Bubble columns and desalination systems are generally understood in the art as evidenced by U.S. Pat. No. 9,643,102 B2, which is incorporated herein by reference.

In acknowledging the desire to minimize entropy generation and improve humidity during the humidification process, the present disclosure addresses two facets of the abovementioned humidification-dehumidification system. These facets include (1) waste heat associated with a thermal element and heating of salinous water and (2) controlling temperature changes between steps of the multi-step design.

Figure 2A:
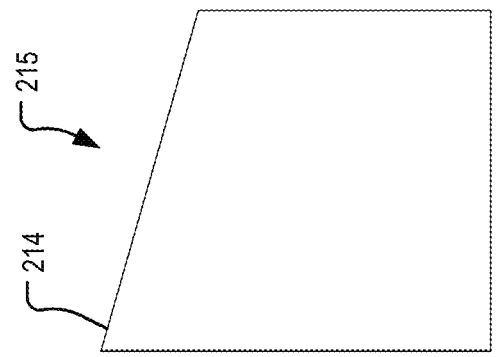
FIG. 2A is a schematic of a phase change material of a thermal element, according to an exemplary embodiment of the present disclosure.

In order to address waste heat associated with a thermal element, FIG. 2A is a schematic of a thermal element. According to an embodiment of the present disclosure, the thermal element 208 comprises a heat absorbing plate 214 on a surface. The heat absorbing plate 214 of the thermal element 208 is arranged on a surface of the thermal element 208 such that it is at an angle equal to geographic latitude, thereby maximizing solar energy absorption. The sloped heat absorbing plate 214 of the thermal element 208, therefore, acts as an inclined, conductive surface such that salinous water entering the humidification subsystem is heated as it passes over the heat absorbing plate 214 and leaves the surface at an elevated temperature.

According to an embodiment, as solar energy heats the heat absorbing plate disposed on the surface of the thermal element, a portion of the solar energy absorbed by the heat absorbing plate will be lost to the body of the thermal element. According to an embodiment of the present disclosure, the thermal element 208 further comprises a PCM (phase change material) 215. As solar energy is absorbed by the heat absorbing plate 214, heat lost from a hidden surface of the heat absorbing plate 214 can be stored within the PCM 215. PCMs are substances with a high heat of fusion, meaning that they are capable of storing and releasing large amounts of energy. In an example, as the temperature rises, the chemical bonds within the PCM begin to break as the material undergoes a transformation from a solid to a liquid. This phase change is an endothermic process and, therefore, the phase change material absorbs heat. Conversely, a phase change from a liquid to a solid, with decreasing temperatures, is an exothermic process and, therefore, heat is released. Uniquely, PCMs function as sensible heat storage systems, initially, meaning their temperature rises as they store heat. However, as a phase change begins, the PCM absorbs heat without a significant rise in temperature until a complete phase change occurs. This results in a unique ability of PCMs, also described as latent heat storage units, to store heat at 5 to 10 times the density of sensible heat storage units.

In the present disclosure, the phase change material 215 can include but is not limited to organic PCMs such as paraffin, inorganic PCMs such as a salt hydrates, and eutectics. More specifically, the phase change material 215 may be selected from a group of phase change materials including but not limited to water, sodium sulfate, lauric acid, trimethylolethane, sodium silicate, magnesium chloride, aluminum, copper, gold, iron, lead, lithium, silver, titanium, zinc, sodium nitrate, sodium nitrite, sodium hydroxide, potassium nitrate, potassium hydroxide, paraffins of from 14 to 34 carbon atoms, preferably 15-33, 16-32, 17-31, 18-30, 19-29, 20-28, 21-27, 22-26, or 23-24 carbon atoms, formic acid, caprilic acid, glycerin, p-lattic acid, methyl palmitate, camphenilone, docasyl bromide, caprylone, phenol, heptadecanone, 1-cyclohexylooctadecane, 4-heptadecanone, p-joluidine, cyanamide, methyl eicosanate, 3-heptadecanone, 2-heptadecanone, hydrocinnamic acid, cetyl acid, a-nepthylamine, camphene, O-nitroaniline, 9-heptadecanone, thymol, methyl behenate, diphenyl amine, p-dichlorobenzene, oxalate, hypophosphoric acid, O-xylene dichloride, β-chloroacetic acid, chloroacetic acid, nitro napthalene, trimyristin, heptaudecanoic acid, a-chloroacetic acid, bees wax, glyolic acid, glycolic acid, p-bromophenol, azobenzene, acrylic acid, dinitrotoluene (2,4), phenylacetic acid, thiosinamine, bromcamphor, durene, methyl brombenzoate, alpha napthol, glautaric acid, p-xylene dichloride, catechol, quinone, actanilide, succinic anhydride, benzoic acid, stibene, benzamide, acetic acid, polyethylene glycol, capric acid, eladic acid, pentadecanoic acid, tristearin, myristic acid, palmitic acid, stearic acid, acetamide, methyl fumarate, microencapsulated acrylate materials, or a combination thereof.

Figure 2B:
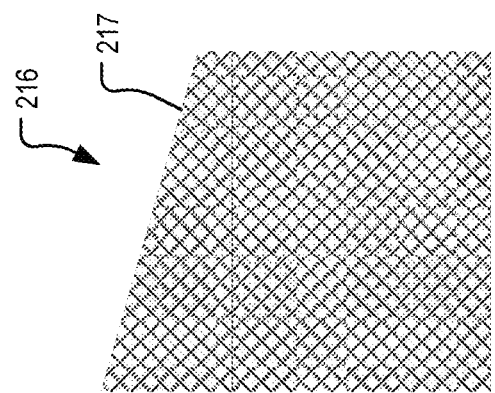
FIG. 2B is a schematic of a thermal conductor of a thermal element, according to an exemplary embodiment of the present disclosure.
Figure 2C:
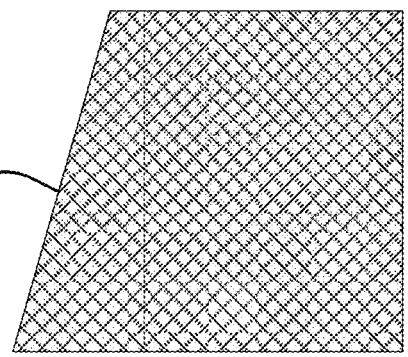
FIG. 2C is a schematic of a thermal element, according to an exemplary embodiment of the present disclosure.

The use of the PCM 215 in the thermal element 208 allows for waste heat to be recycled and used in the heating of the heat absorbing plate 214 and, subsequently, the salinous water. While the PCM effectively stores energy at densities higher than other storage approaches (e.g. sensible heat storage), its inability to conduct heat efficiently can result in concentrations of heat near the heat absorbing plate 214. According to an embodiment, the thermal element 208 can further comprise a thermal conductor 216. FIG. 2B is a schematic of a thermal conductor of a thermal element, according to an exemplary embodiment of the present disclosure. The thermal conductor 216 can include but is not limited to a metallic mesh 217. The metallic mesh 217 can comprise an internal structure that is aligned, random, or a combination thereof. The arrangement of each strut of the lattice of the metallic mesh 217 is in context of a goal of homogenous melting and solidification of the PCM 215. Moreover, the porosity of the metallic mesh 217 allows for efficient heat transfer without significantly reducing the heat storage capacity of the PCM 215. According to an embodiment, the metallic mesh 217 is a conducting metal including but not limited to aluminum, copper, and nickel. Together, as shown in FIG. 2C, the PCM 215, and the metallic mesh 217 embedded within, form a thermal energy storage unit 218. This thermal energy storage unit 218 works integrally with the heat absorbing plate 214 to continuously heat a salinous water stream at a visible surface of the heat absorbing plate 214.

In addition to energy storage and release within the thermal element, critical to the adequate heating of the salinous water entering the humidification subsystem is the length of contact time between the salinous water and the heat absorbing plate. On a flat surface, the salinous water flows rapidly over the inclined heat absorbing plate, limiting the temperature rise of the salinous water. FIG. 3A and FIG. 3B are a lateral view and a superficial view of the thermal element, respectively. According to an embodiment of the present disclosure, the thermal element 308 is a thermal energy storage unit 318. In order to increase contact time between the salinous water and the heat absorbing plate 314 of the thermal energy storage unit 318, one or more levees 319 can be disposed on the visible surface of the heat absorbing plate 314. The one or more levees 319 can be distributed evenly or arranged randomly, and can be continuous or discontinuous across the surface of the heat absorbing plate 314. The one or more levees 319 can be of a cross sectional shape including but not limited to a rectangle, a hemisphere, a sphere, a triangle, a square, or a combination thereof intended to inhibit the flow of the salinous water. The cross sectional dimensions of the one or more levees 319 can vary across each of the one or more levees 319 in order to control the amount of contact time between the salinous water and the heat absorbing plate 314, such that a target exit temperature of the salinous water can be achieved. In an example, the cross sectional dimensions of each of the one or more levees 319 is constant. In another example, the height parameter of the cross sectional dimensions of the one or more levees 319 increases as the salinous water flows towards an adjacent bubble column, further increasing the temperature of the salinous water upon exit from the thermal element 308.

According to an embodiment of the present disclosure, each one of the one or more levees 319 disposed on the heat absorbing plate 314 is continuous across the surface of the heat absorbing plate 314, is distributed evenly along the surface of the heat absorbing plate 314, and is of height equal to 1 cm, as measured from the surface of the heat absorbing plate 314.

In order to further improve heating efficiency and decrease temperature gradients between subsequent bubble columns, a humidification subsystem including a plurality of thermal elements and solar energy concentrators is considered. FIG. 4 is a schematic of a humidification subsystem. According to an exemplary embodiment of the present disclosure, the humidification subsystem 410 comprises a plurality of thermal elements 408 arranged adjacent to a plurality of bubble columns 411. Each of the plurality of thermal elements 408 is a thermal energy storage unit 418 comprising a PCM 415 and a metallic mesh 417. A heat absorbing plate 414 is disposed on a surface of each of the thermal elements 408 and, subsequently, the plurality of thermal energy storage units 418. Further, a plurality of levees 419 is disposed on each heat absorbing plate 414. Arranged above each of the plurality of thermal elements 408, and optically aligned with the surface of the heat absorbing plate 414, is a solar energy concentrator 421. Each of the solar energy concentrators 421 can be a Fresnel lens 425 or similar structure such as a parabolic reflector for redirecting solar energy 402 to a focal area. Each solar energy concentrator 421 amplifies the heating of the salinous water as the flow breaches each of the plurality of levees 419 disposed on the surface of the heat absorbing plate 414. Moreover, each solar energy concentrator 421 increases the rate at which heat is delivered to the thermal energy storage unit 418 of the thermal element 408. In an embodiment, the solar energy concentrator 421 can be positioned such that lateral surfaces and superficial surfaces of the thermal energy storage unit 418 are heated concurrently.

According to an embodiment of the present disclosure, each one of the plurality of thermal elements 408, and respective solar energy concentrators 421, is distributed within the humidification subsystem 410 such that each one of the plurality of thermal elements 408 serves as a partition between each one of the plurality of bubble columns 411. This arrangement allows for continual heating of the salinous water throughout the humidification subsystem 410, thereby minimizing temperature gradients between bubble columns and allowing for an increasingly humidified resulting air stream.

In an example, a blower 401 provides an air stream 405 to a plurality of bubble columns 411. Each one of the plurality of bubble columns 411 includes a perforated plate 412. Upon application of the air stream 405 through the perforated plate 412, salinous water 403 is supplied to the humidification subsystem 410 by conduit to the visible surface of a heat absorbing plate 414 of a thermal element 408 via the fluid inlet 426. A Fresnel lens 425 directs solar energy towards the thermal element 408 and superficial and lateral surfaces of a thermal energy storage unit 418, therein. The visible surface of each of the plurality of heat absorbing plates 414 is oriented in accordance with the latitude and the position of the sun and the Fresnel lenses 425. The thermal energy storage unit 418 comprises a metallic mesh 417 embedded within a PCM 415. In order to increase contact time between the salinous water 403 and the heat absorbing plate 414 of each thermal element 408, a plurality of levees 419 are disposed on the visible surface of the heat absorbing plate 414. Each one of the plurality of levees 419 must be breached in order for the salinous water 403 to reach subsequent levees and/or bubble columns. As the salinous water 403 traverses a first thermal element, it reaches a first bubble column. Relatively cool air from the air stream 405 is pushed through the perforated plate 412 and energy is transferred from the salinous water 403 to the air stream 405 in the fluid tray 420 as heat. This heat transfer results in a humidified air 413 that leaves the fluid tray 420 and is directed upwards towards a slanted roof of the humidifier subsystem 410. In an embodiment, the salinous water 403 is heated to a temperature relatively higher than the temperature of the air stream 405. More specifically, the salinous water 403 is heated to a temperature of 60° C. and the gas stream 405 is at an ambient temperature of 32° C. As additional salinous water 403 is added to the fluid tray 420, the height of the salinous water 403 in the fluid tray 420 increases until a height is reached at which point the salinous water 403 spills over into a subsequent thermal element and the heating and humidification is repeated. Following the generation of the humidified air 413, the humidified air 413 travels up and along the slanted roof of the humidifier subsystem 410 until a fluid outlet 429 is reached. The fluid outlet 429 can be connected to a variety of dehumidification subsystems including but not limited passive condensers and greenhouses.

According to an embodiment of the present disclosure, the sloped roof of the humidification subsystem 410 is generally parallel to a line drawn between the fluid inlet 426 of the salinous water 403 and the lowest point of the furthest bubble column. In this way, control valves and/or gravity can be used to passively move the salinous water 403 through the subsystem and the humidified air 413 can follow the angle of the sloped roof to the fluid outlet 429.

Figure 5:
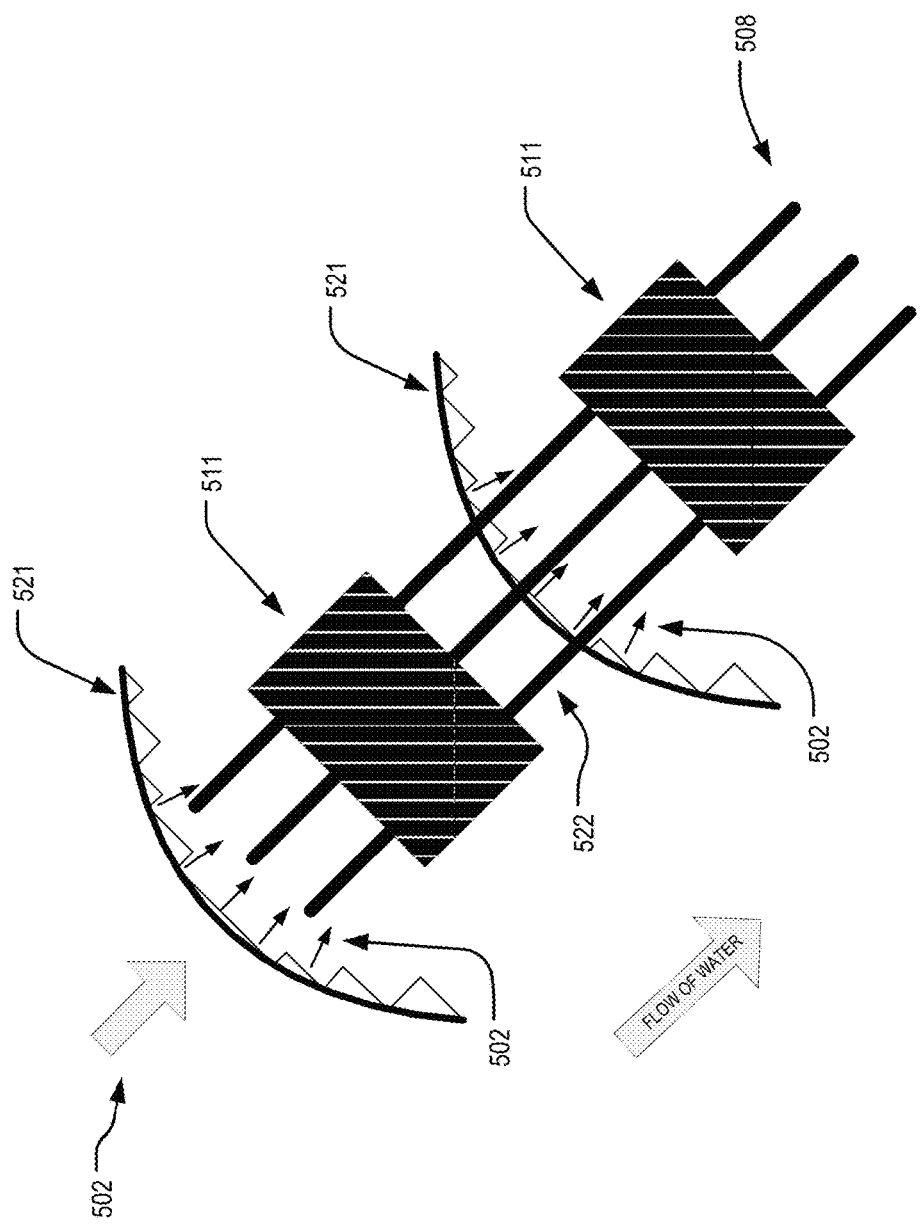
FIG. 5 is a superficial view of a humidification subsystem, according to an exemplary embodiment of the present disclosure.

According to an embodiment of the present disclosure, the thermal element of the humidification subsystem is a plurality of heat absorbing pipes 522. FIG. 5 is a superficial view of a section of a humidification subsystem substantially similar to that of FIG. 4, but wherein the thermal element 508 comprises a plurality of heat absorbing pipes 522. Each one of the plurality of heat absorbing pipes 522 can include but is not limited to a black-painted stainless steel pipe. The plurality of heat absorbing pipes 522 can be heated by a variety of solar energy concentrators 521 including but not limited to a Fresnel lens. In an example, salinous water is flowing through each of the plurality of heat absorbing pipes 522 at a known flow rate. Prior to arriving at a bubble column 511, solar energy 502 is focused on the surface of each of the plurality of heat absorbing pipes 522 via the optically aligned solar energy concentrator 521. Heated salinous water is then delivered to a first bubble column 511 for humidification of a gas stream. Upon exiting the first bubble column the salinous water is further heated by a solar energy concentrator 521 directed at the plurality of heat absorbing pipes 522 prior to arriving at a subsequent bubble column 511.

Figure 6:
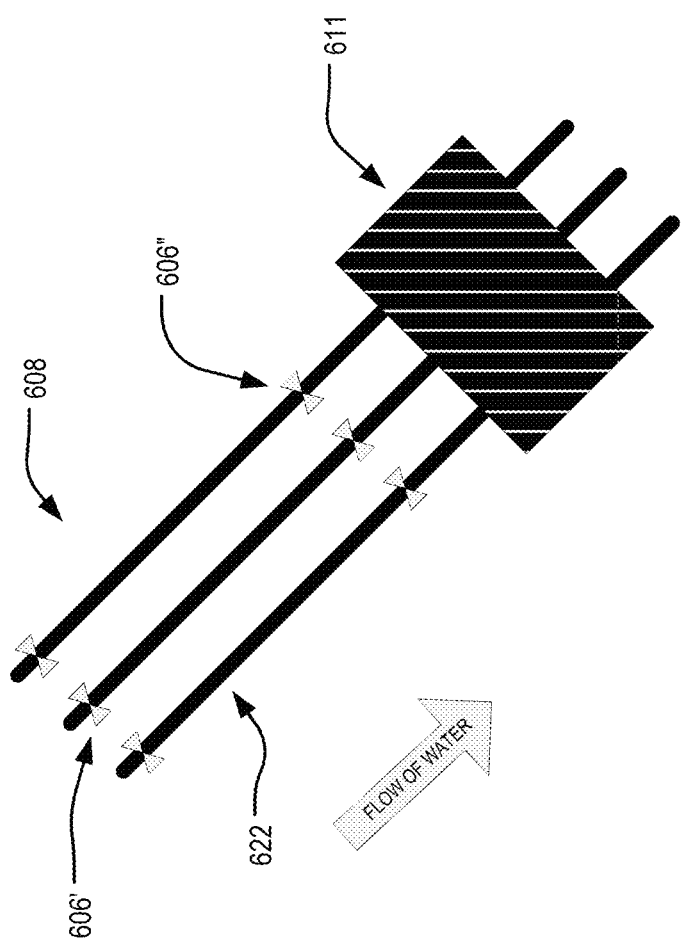
FIG. 6 is a superficial view of a segment of a humidification subsystem, according to an exemplary embodiment of the present disclosure.

According to an embodiment of the present disclosure, each one of the plurality of heat absorbing pipes can be outfitted with a series of control valves or a single control valve can be used for the plurality of heat absorbing pipes. FIG. 6 is a superficial view of a segment of a humidification subsystem. The heat absorbing pipes 622 are a conduit for salinous water. Initially, inlet valves 606' are opened, while outlet valves 606" are closed, to allow salinous water to fill the heat absorbing pipes 622. The salinous water-filled heat absorbing pipes 622 are heated by an optically aligned solar energy concentrator (e.g. Fresnel lens) in order to rapidly raise the temperature of the water. A more complete implementation of the methodology of the abovementioned levees, the use of control valves ensures a stagnant and more rapidly heated volume of salinous water. Once a pre-determined temperature is achieved within the heat absorbing pipes 622, as may be measured by a thermocouple, the outlet valve 606" is opened to flow the salinous water through subsequent stages of the humidification subsystem via gravity. The heated salinous water is replaced with ambient salinous water and the valves are again controlled in order to heat the incoming salinous water.

According to an embodiment, the system can be improved by installing an automated control system based on input data including but not limited to flow rate of water, concentration ratio of Fresnel lens and consequential water heating potential, metrological data, and sun trajectory.

Figure 7:
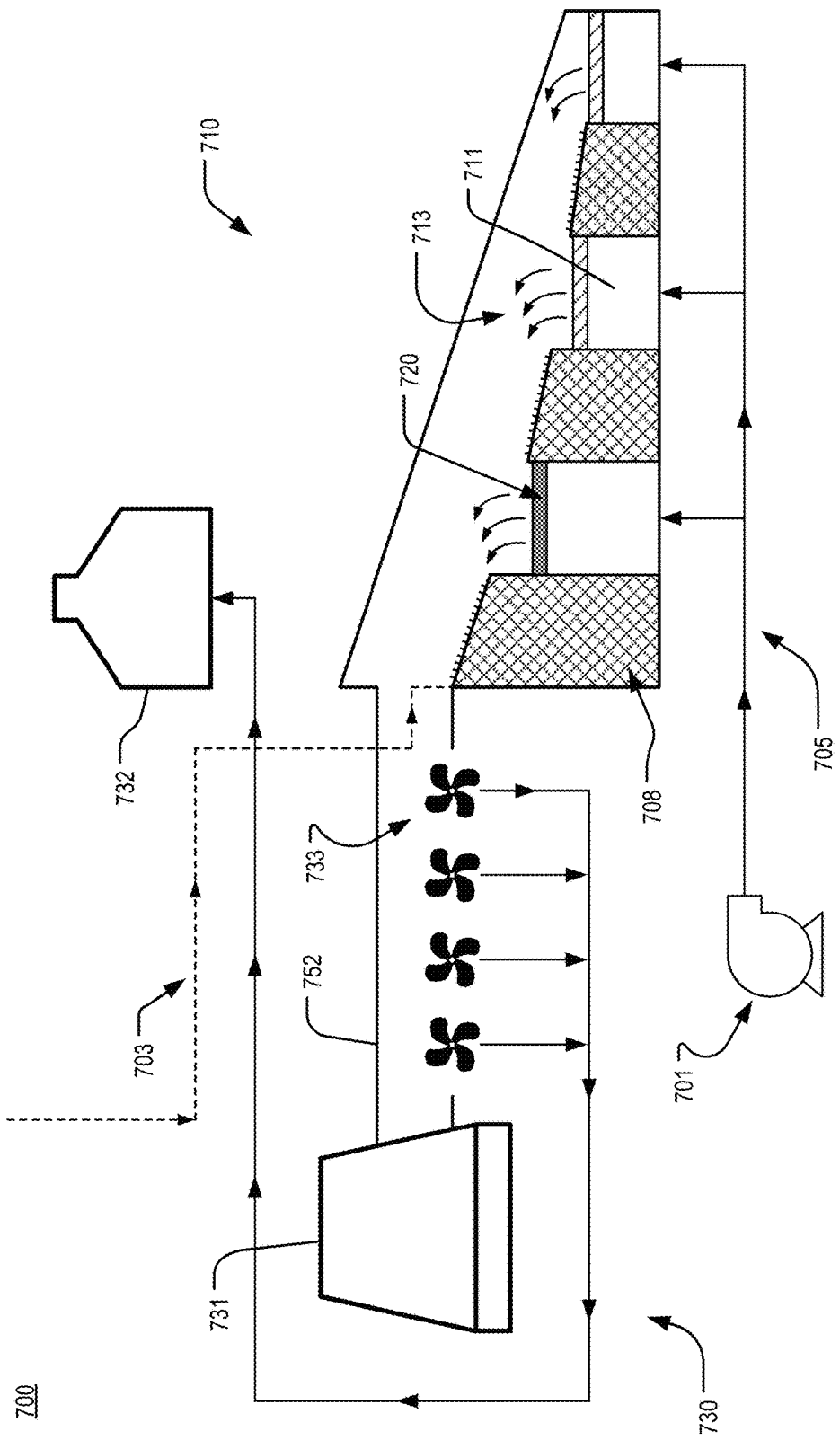
FIG. 7 is a schematic of a humidification-dehumidification system, according to an exemplary embodiment of the present disclosure.

One of the major concerns for remote communities, in both developing and underdeveloped countries, is access to electricity and power. A solution that allows for a desalination system to operate without a power supply is critical to feasibility in these environments. FIG. 7 is a schematic of a humidification-dehumidification system 700 comprising latent turbines for the generation of electricity. According to an exemplary embodiment of the present disclosure, a blower 701 provides an air stream 705 to a humidification subsystem 710. The air stream 705 is combined with salinous water 703 via a thermal element 708 in a fluid tray 720 of a bubble column 711. It can be appreciated that the humidification subsystem 710 may further comprise one or more solar energy concentrators, as described previously.

Following heat transfer between the salinous water 703 and the air stream 705 in the fluid tray 720, humidified air 713 is directed towards a dehumidification subsystem 730. According to an embodiment, the dehumidification subsystem 730 comprises an elongated chamber 752, including one or more latent turbines 733, a passive condenser 731 and drinking water storage tank 732. At each of the one or more latent turbines 733, the humidified air 713 is accelerated, according to the principles of Bernoulli's equation, and its energy is converted into mechanical energy within the turbine and, consequently, electrical energy. While the basic principle dictates that water evaporates as it gains solar energy, conversely, as it condenses, it loses that same solar energy, which can be recycled to heat the remaining water (see FIG. 1). According to an embodiment of the present disclosure, however, the energy lost by the water is converted to electricity and, therefore, is not similarly recycled.

Acceleration of the humidified air 713 is achieved by reducing the cross-sectional area of the elongated chamber 752 through which the humidified air 713 is passed until a pre-determined velocity is reached. As the humidified air 713 travels through each of the one or more latent turbine 733 phases, the velocity of the humidified air 713 will decrease. Concurrently, as the humidified air 713 passes through each of the one or more latent turbines 733, the humidified air 713 will lose energy and some of the lower energy humidified air 713 will condense and be redirected to the drinking water storage tank 732. The remaining humidified air 713 remains at a high energy and is directed down the elongated chamber 752 to subsequent latent turbines 733, if present. As the velocity of the humidified air 713 decreases with each latent turbine phase, in order to achieve an air velocity sufficient for power generation, the diameter of the elongated chamber 752 leading to each latent turbine 733 must be progressively decreased. In an example, where $D_1$ is the diameter of the elongated chamber prior to a first latent turbine, $D_2$ is the diameter of the elongated chamber prior to a second latent turbine, and $D_i$ is the diameter of the elongated chamber prior to an $i^{th}$ latent turbine, $D_1 > D_2 > D_i$.

As the humidified air 713 passes through the latent turbines 733, it will not have the sufficient energy needed to overcome the pressure drop of a bubble column. Therefore, following passage through the elongated chamber 752, the humidified air 713 enters the passive condenser 731. According to an embodiment, the passive condenser 731 can be shaded by a solar panel in order to simultaneously block unwanted radiation and to generate electricity for external use.

According to an embodiment, the latent turbines 733 are organized in a multi-extraction scheme such that humidified air 713 can enter each phase or bypass the power generation phases, entropy generation is minimized, and distillate is collected from each latent turbine 733 and from humidified air 713 in the passive condenser 731.

According to an embodiment, humidified air 713 is sub-cooled in order to extract additional energy from the condensed humidified air 713. In an example, the passive condenser 731 can include a cooling system for lowering the condensing temperature below an ambient temperature to release additional energy from the humidified air 713.

Figure 8:
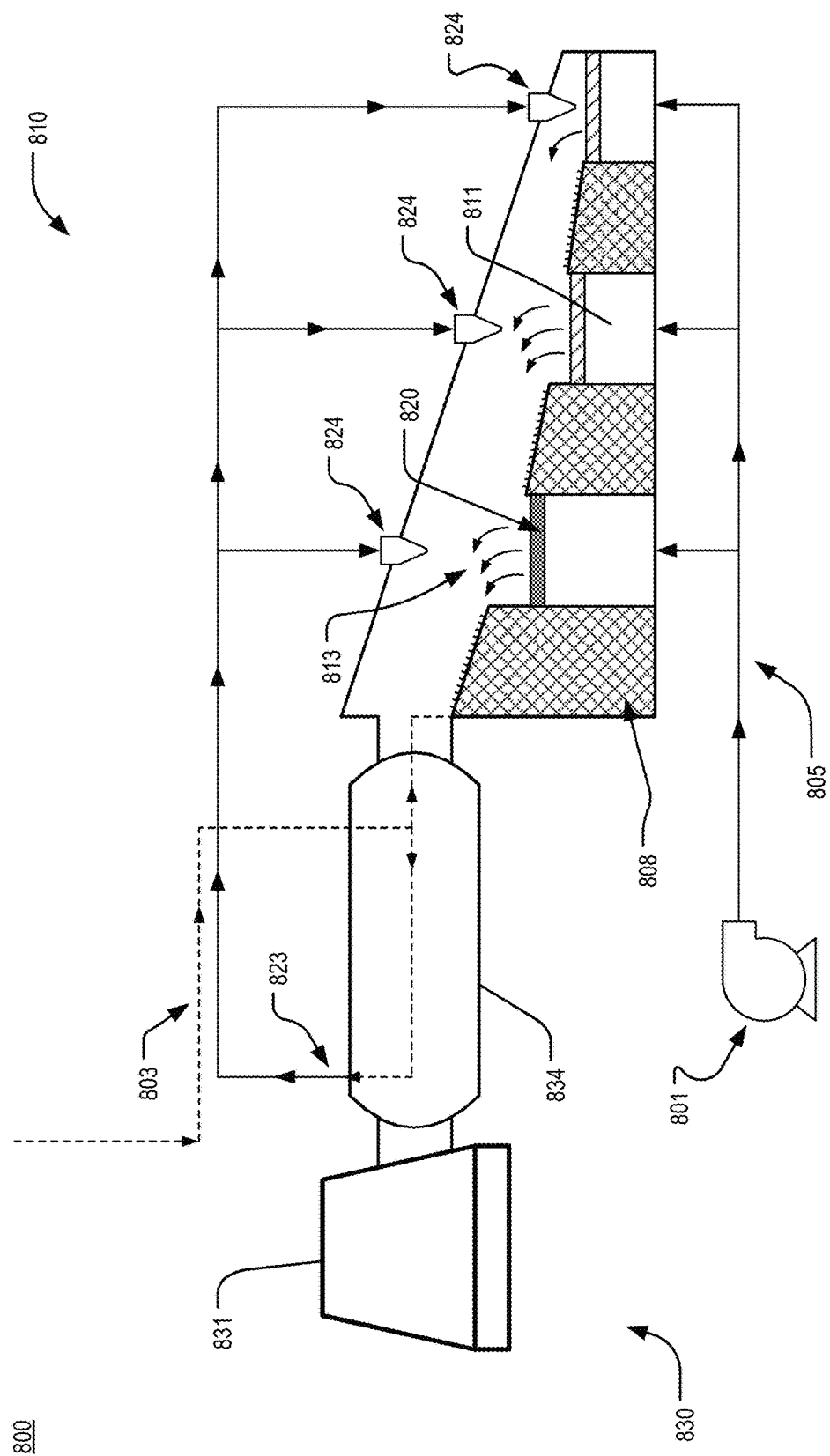
FIG. 8 is a schematic of a humidification-dehumidification system, according to an exemplary embodiment of the present disclosure.

FIG. 8 is a schematic of a humidification-dehumidification system 800 substantially similar to the humidification-dehumidification system of FIG. 7, but employing sprinklers. According to an exemplary embodiment of the present disclosure, a blower 801 provides an air stream 805 to a humidification subsystem 810. The air stream 805 is combined with salinous water 803 via a thermal element 808 in a fluid tray 820 of a bubble column 811. It can be appreciated that the humidification subsystem 810 may further comprise one or more solar energy concentrators, as described previously.

Following heat transfer between the salinous water 803 and the air stream 805 in the fluid tray 820, humidified air 813 is directed towards a dehumidification subsystem 830. According to an embodiment, the dehumidification subsystem 830 comprises a heat exchanger 834. Within the heat exchanger 834, a portion of the humidified air 813 is routed to heat incoming salinous water 803, the condensate of which is collected in a passive condenser 831. Once heated, this salinous water 803 is routed to one or more sprinklers 824 in the humidification subsystem 810. Each of the one or more sprinklers 824 is located above a bubble column 811 such that direct contact is provided between the heated salinous water 803 and the humidified air 813, thereby increasing absolute humidity. The portion of the humidified air 813 not routed for heating of the incoming salinous water 803 is directed to the passive condenser 831 and cooled.

According to an embodiment of the present disclosure, the humidification subsystem can be further coupled with a greenhouse crop production unit in water scarce, arid areas.

Figure 9:
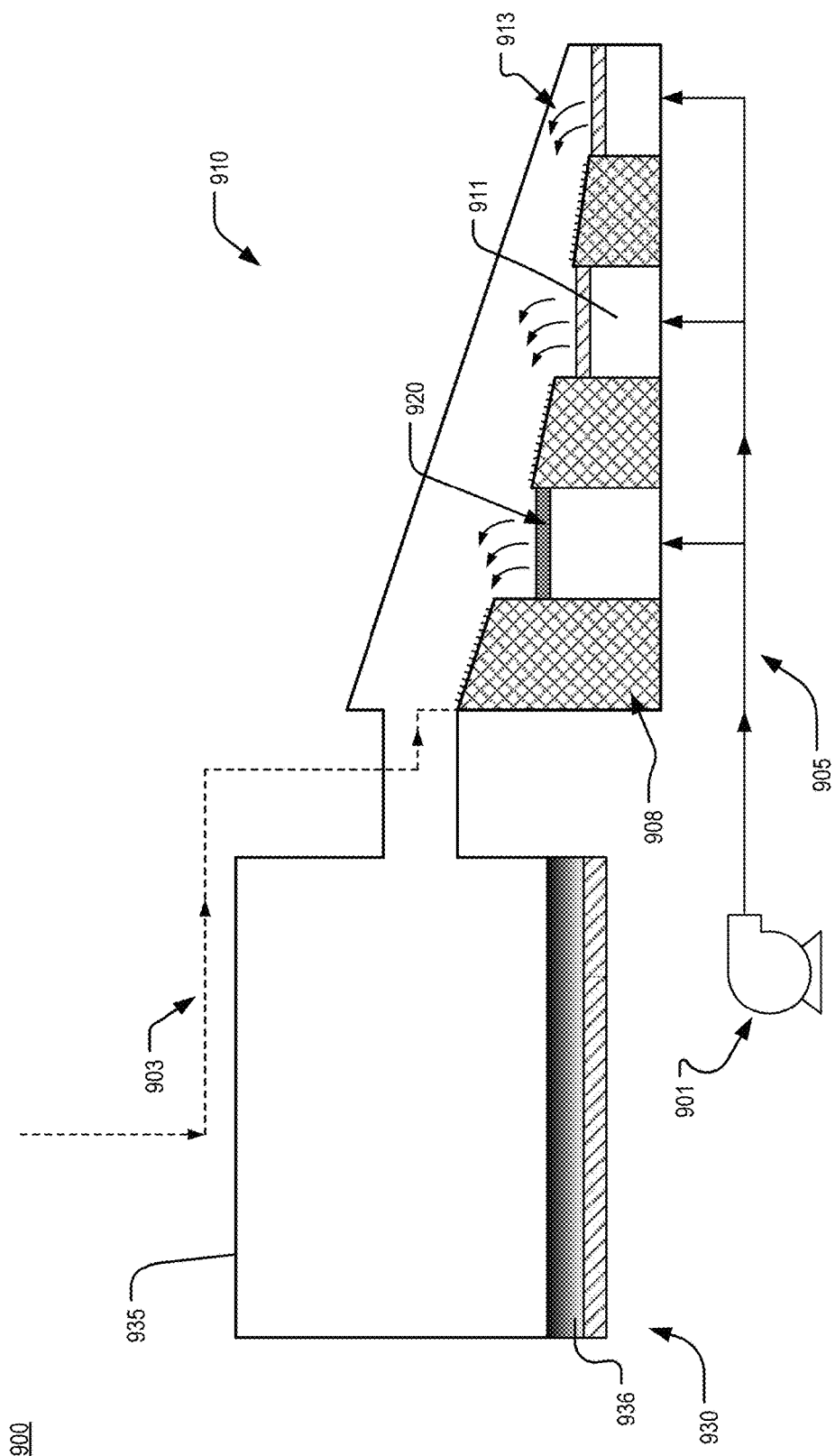
FIG. 9 is a schematic of a humidification-dehumidification system, according to an exemplary embodiment of the present disclosure.

The environmental conditions in these areas limit the choice of crops to those that require minimal water and can survive the environmental conditions. Moreover, while many vegetables need little water to grow, including black-eyed peas, snap beans, pole beans, melons, squash and tomatoes, they often require controlled temperatures. Coupling the humidification subsystem with a greenhouse crop production unit not only provides a humid atmosphere for agriculture, but can control temperature while increasing humidity levels that minimize the transpiration rate of vegetation, thereby reducing the water lost through the leaves of the vegetation. FIG. 9 is a schematic of a humidification-dehumidification system 900, substantially similar to the humidification-dehumidification system of FIG. 7, but coupling a humidification subsystem 910 with a greenhouse 935 of a dehumidification subsystem 930.

According to an exemplary embodiment of the present disclosure, a blower 901 provides an air stream 905 to a humidification subsystem 910. The air stream 905 is combined with salinous water 903 via a thermal element 908 in a fluid tray 920 of a bubble column 911. It can be appreciated that the humidification subsystem 910 may further comprise one or more solar energy concentrators, as described previously. Following heat transfer between the salinous water 903 and the air stream 905 in the fluid tray 920, humidified air 913 is directed towards a dehumidification subsystem 930.

According to an embodiment, the dehumidification subsystem 930 comprises the greenhouse 935. As humidified air 913 leaves the humidification subsystem 910 and enters the greenhouse 935, it undergoes rapid expansion. This expansion causes rapid cooling and loss of moisture in a portion of the humidified air 935. This cooling and loss of moisture provides irrigation for crops 936, while the remaining humidified air 935 maintains the temperature and humidity of the greenhouse 935.

According to an embodiment, the present disclosure provides conditions necessary for proper growth of multiple crops 936, as the continuous condensation of water from the incoming humidified air 935 ensures that the crops 936 are properly irrigated. Any condensed water not needed for crop 936 irrigation can be rerouted to a passive condenser, to another greenhouse, or a combination thereof.

According to an embodiment, in addition to expansion of the humidified air 913, the temperature of the greenhouse 935 can be controlled by interaction of the humidified air 913 with a heat exchanger of the kind described in FIG. 8, and as would be understood by one of ordinary skill in the art.

In order to obtain drinking water from sea water, water from conventional solar stills often requires mineral supplementation, a two-step process. Using the osmotic nature of highly concentrated salt solutions, the present disclosure describes a process for simultaneous dehumidification and mineral supplementation.

Figure 10:
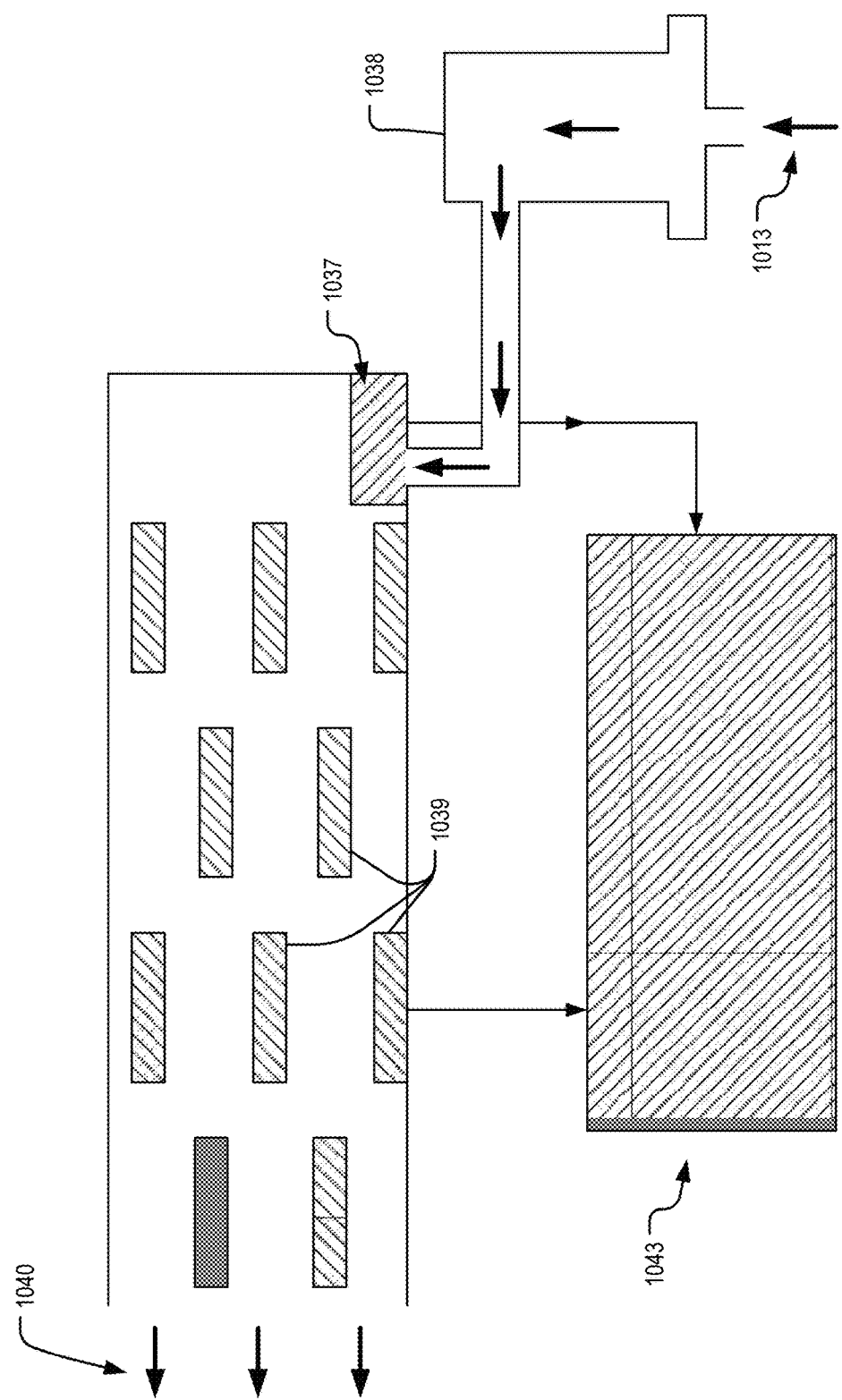
FIG. 10 is a schematic of a dehumidification subsystem, according to an exemplary embodiment of the present disclosure.

FIG. 10 is a schematic of a dehumidification subsystem for mineral supplementation. According to an exemplary embodiment of the present disclosure, humidified air 1013 from a humidification subsystem is directed to a compressor 1038 that provides the humidified air 1013 to the dehumidification subsystem 1030 at a high temperature and with a relative humidity of 1. The compressed, humidified air 1013 then passes through a bubble dehumidifier 1037, wherein the resulting temperature of the humidified air 1013 will depend on the efficacy of the bubble dehumidifier 1037. Following passage through the bubble dehumidifier 1037, the humidified air 1013 will be at a lower temperature but still capable of releasing more energy.

Exploiting the osmotic properties of highly concentrated salt solutions, one or more desiccant trays 1039 are arranged such that more essential minerals are in proximity to the bubble dehumidifier 1037 while less critical minerals are positioned at distance from the bubble dehumidifier 1037. Condensed water from the one or more desiccant trays 1039 and the bubble dehumidifier 1037 are combined in a drinking water reservoir 1043 such that mineral levels are within a pre-determined range for human consumption. Humidified air 1013 not absorbed into one of the one or more desiccant trays 1039 exits the desiccation phase as cooled humidified air 1040. This cooled humidified air 1040 can be further condensed within a passive condenser or via sub-cooled approaches.

According to an embodiment, the salt quantity of each of the one or more desiccant trays 1039 can be adjusted in real time, according to the requirements of the drinking water reservoir 1043. Each of the one or more desiccant trays 1039 can be connected to several ion/salt storage tanks depending upon the needed salt at a given time.

Figure 11:
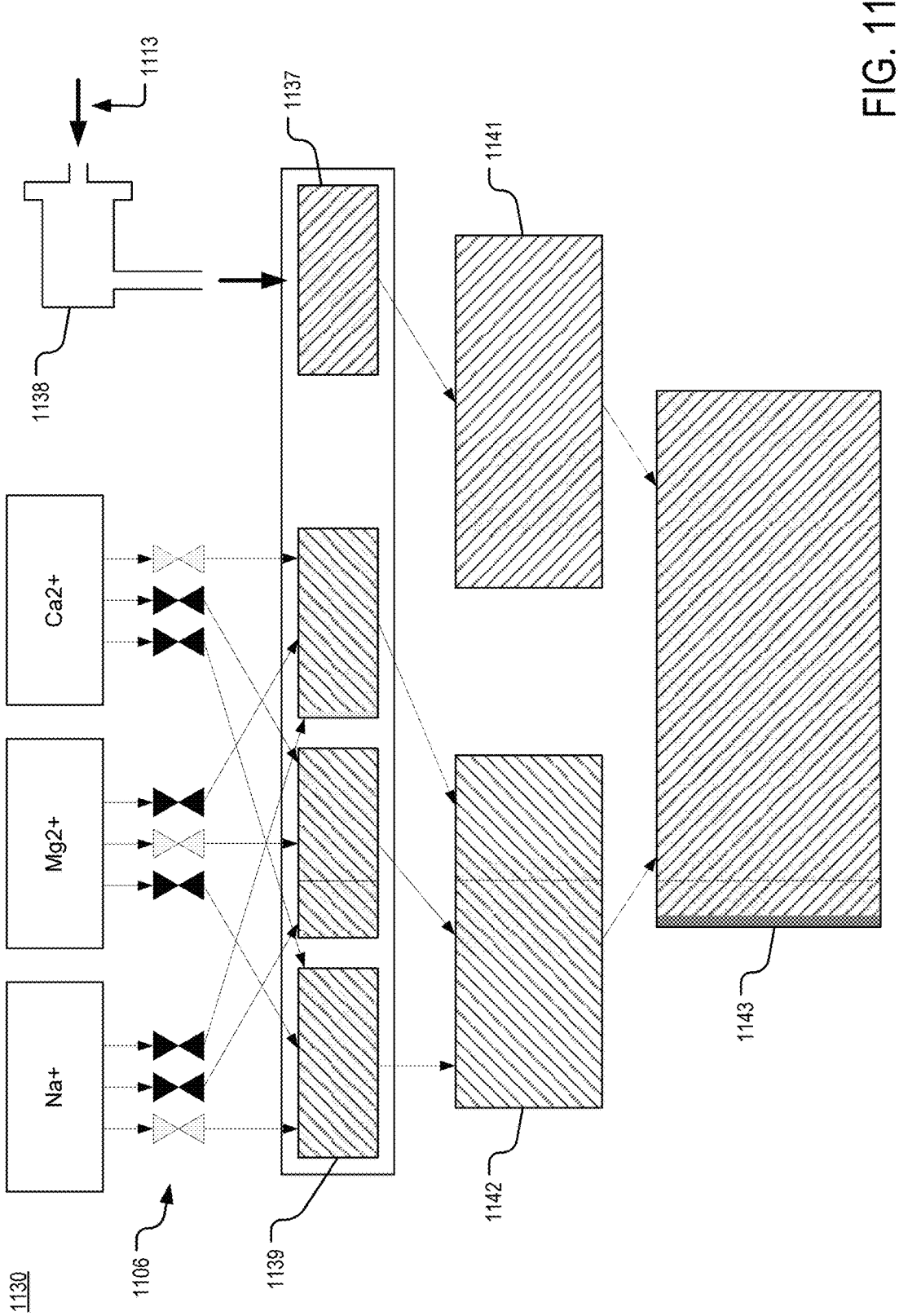
FIG. 11 is a schematic of a dehumidification subsystem, according to an exemplary embodiment of the present disclosure.

The system can be modified such that all salt solutions are connected to each one of the one or more desiccant trays. FIG. 11 is a schematic of a dehumidification subsystem 1130 employing a variety of salt solutions and control valves. According to an exemplary embodiment of the present disclosure, humidified air 1113 from a humidification subsystem is directed to a compressor 1138 that provides the humidified air 1113 to the dehumidification subsystem 1130 at a high temperature and with a relative humidity of 1. The compressed, humidified air 1113 then passes through a bubble dehumidifier 1137, wherein the resulting temperature of the humidified air 1113 will depend on the efficacy of the bubble dehumidifier 1137. Following passage through the bubble dehumidifier 1137, the humidified air 1113 will be at a lower temperature but still capable of releasing more energy.

According to an exemplary embodiment of the present disclosure, the remaining humidified air 1113 is passed through one or more desiccant trays 1139. Each of the one or more desiccant trays 1139 can be individually controlled via control valves 1106. The three most common ions used for mineralizing drinking water, sodium, magnesium, and calcium, are depicted in FIG. 11.

Following condensation within the bubble dehumidifier 1137 and the one or more desiccant trays 1139, the resulting cool, humidified air can be directed to a passive condenser. The concentrated salt solution 1142 derived from the one or more desiccant trays 1139 is combined with a pure water reservoir 1141 derived from the bubble dehumidifier 1137 to form a drinking water reservoir 1143. In an embodiment, the flow of salt solutions to each of one or more desiccant trays 1139 can be connected via control valves 1106 that selectively control the volume and type of salt solution required. The salt in each of the one or more desiccant trays 1139 is determined by carefully monitoring their concentrations in the drinking water reservoir 1143 and, in turn, adjusting the concentrations in the desiccant trays 1139 via the control valves 1106. The control valves 1106 can include but are not limited to solenoid actuated control valves.

According to an embodiment, water can be used instead of desiccant in a subset of the one or more desiccant trays 1139 when a concentration of a salt solution or ion is higher than appropriate and cannot be diluted adequately with volume of water extracted from the bubble dehumidifier 1137. In another embodiment, the bubble dehumidifier 1137 could be expanded from a single-stage design to a multi-stage design ensuring adequate condensation of the compressed humidified air 1113.

Figure 12:
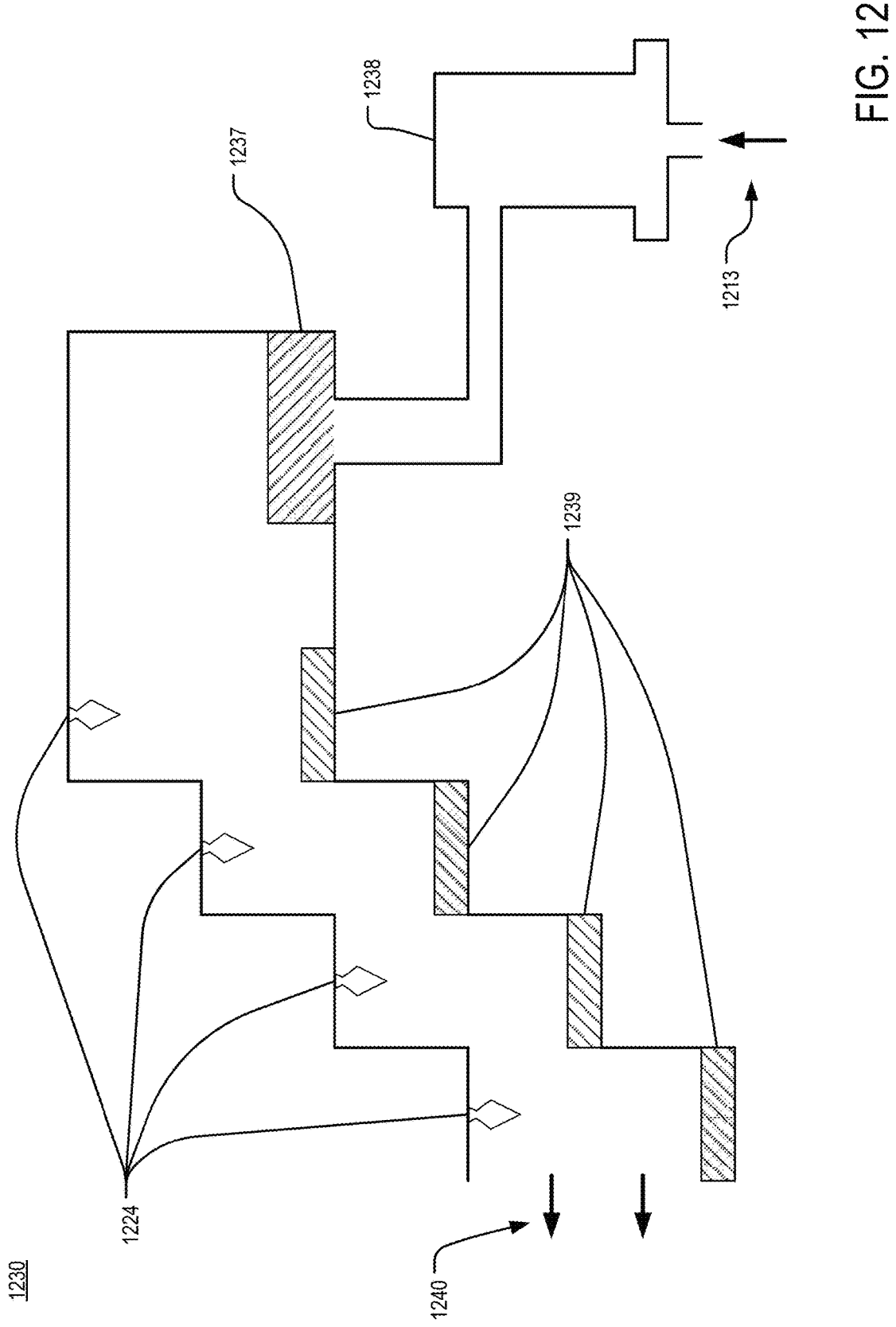
FIG. 12 is a schematic of a dehumidification subsystem, according to an exemplary embodiment of the present disclosure.

According to an embodiment, the one or more desiccant trays are disconnected from the salt storage tanks. Alternatively, the salt storage tanks are connected to sprinklers in a dehumidification subsystem. FIG. 12 is a schematic of a dehumidification subsystem, substantially similar to the dehumidification subsystem of FIG. 11, but employing sprinklers for delivering the salt solution. According to an exemplary embodiment of the present disclosure, humidified air 1213 from a humidification subsystem is directed to a compressor 1238 that provides the humidified air 1213 to the dehumidification subsystem 1230 at a high temperature and with a relative humidity of 1. The compressed, humidified air 1213 then passes through a bubble dehumidifier 1237, wherein the resulting temperature of the humidified air 1213 will depend on the efficacy of the bubble dehumidifier 1237. Following passage through the bubble dehumidifier 1237, the humidified air 1213 will be at a lower temperature but still capable of releasing more energy.

According to an exemplary embodiment of the present disclosure, one or more sprinklers 1224 are positioned above each of the one or more desiccant trays 1239. Each of the one or more sprinklers 1224 can disperse droplets of salts into the compressed humidified air 1213 exiting from the bubble dehumidifier 1237. As the humidified air 1213 mixes with the salt droplets from the one or more sprinklers 1224 and condenses in the dehumidification subsystem, resulting water is collected in the one or more desiccant trays 1239. Each of the one or more sprinklers 1224 can be individually controlled via control valves to modify salt concentration. The three most common ions used for mineralizing drinking water, sodium, magnesium, and calcium, are depicted in FIG. 11.

Following condensation within the bubble dehumidifier 1237 and the one or more desiccant trays 1239, the resulting cool, humidified air can be directed to a passive condenser. The concentrated salt solution derived from the one or more desiccant trays 1239 can be combined with a pure water reservoir derived from the bubble dehumidifier 1237 to form a drinking water reservoir. In an embodiment, the flow of salt solutions to each of one or more sprinklers 1224 can be connected via control valves that selectively control the volume and type of salt solution required. The salt in each of the one or more sprinklers 1239 is determined by carefully monitoring their concentrations in the drinking water reservoir and, in turn, adjusting the concentrations in the sprinklers 1224 via the control valves. The control valves can include but are not limited to solenoid actuated control valves.

The use of the one or more sprinklers 1224 increases the surface area of the desiccant in contact with the humidified air 1213, an approach used similarly in HVAC systems.

Figure 13:
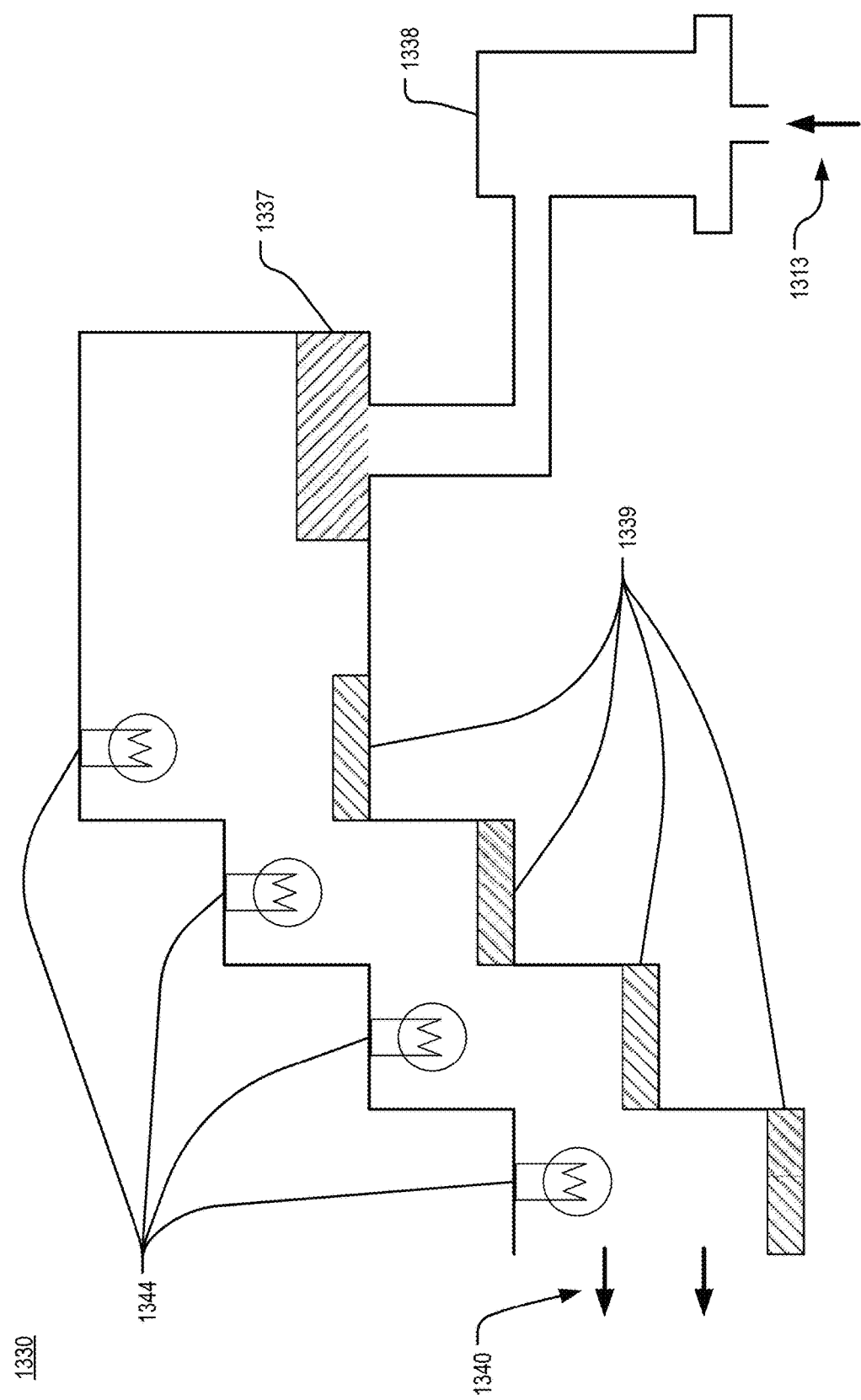
FIG. 13 is a schematic of a dehumidification subsystem, according to an exemplary embodiment of the present disclosure.

According to another embodiment, one or more cooling coils, a type of heat exchanger, are positioned above one or more desiccant trays in the dehumidification subsystem. FIG. 13 is a schematic of a dehumidification subsystem 1330, substantially similar to the dehumidification subsystem of FIG. 12, but with cooling coils for condensing humidified air.

According to an exemplary embodiment of the present disclosure, humidified air 1313 from a humidification subsystem is directed to a compressor 1338 that provides the humidified air 1313 to the dehumidification subsystem 1330 at a high temperature and with a relative humidity of 1. The compressed, humidified air 1313 then passes through a bubble dehumidifier 1337, wherein the resulting temperature of the humidified air 1313 will depend on the efficacy of the bubble dehumidifier 1337. Following passage through the bubble dehumidifier 1337, the humidified air 1313 will be at a lower temperature but still capable of releasing more energy. Subsequently, and according to an exemplary embodiment of the present disclosure, as the humidified air 1313 is directed through the dehumidification subsystem 1330, it is passed by one or more cooling coils 1344. Each of the one or more cooling coils 1344 is positioned above one of one or more desiccant trays 1339. Refrigerant, used to maintain a cooled temperature, flows through each of the one or more cooling coils 1344 at a known rate and temperature. The humidified air 1313 passed over the one or more cooling coils 1344 experiences a decrease in temperature and energy. Subsequent loss of moisture from the humidified air 1313 falls into to the one or more desiccant trays 1339 positioned below.

According to an embodiment, each of the one or more desiccant trays 1339 can be individually controlled via control valves in order to control the salt concentration in each. The three most common ions used for mineralizing drinking water, sodium, magnesium, and calcium, are depicted in FIG. 11.

Following condensation within the bubble dehumidifier 1337 and the one or more desiccant trays 1339, the resulting cool, humidified air 1340 can be directed to a passive condenser. The concentrated salt solution derived from the one or more cooling coils 1344 via the one or more desiccant trays 1339 can be combined with a pure water reservoir derived from the bubble dehumidifier 1337 to form a drinking water reservoir. In an embodiment, the flow of salt solutions to each of one or more desiccant trays 1339 can be connected via control valves that selectively control the volume and type of salt solution required. The salt in each of the one or more desiccant trays 1339 is determined by carefully monitoring their concentrations in the drinking water reservoir and, in turn, adjusting the concentrations in the desiccant trays 1339 via the control valves. The control valves can include but are not limited to solenoid actuated control valves.

According to an embodiment, the flow of refrigerant to each of the one or more cooling coils 1344 can be controlled and varied from one side of the dehumidification subsystem 1330 to the other. In an example, each of the one or more cooling coils 1344 can be set to a different flow rate of refrigerant, resulting in variable rates of condensation and, thus, variable salt concentrations in the drinking water reservoir.

According to an embodiment, one or more pumps are integrated within the dehumidification subsystem 1330 to control the flow of refrigerant to each of the one or more cooling coils 1344.

According to an embodiment, the refrigerant can include but is not limited to water, air, chlorofluorocarbons, hydrochlorofluorocarbons, and hydrofluorocarbons.

Figure 14:
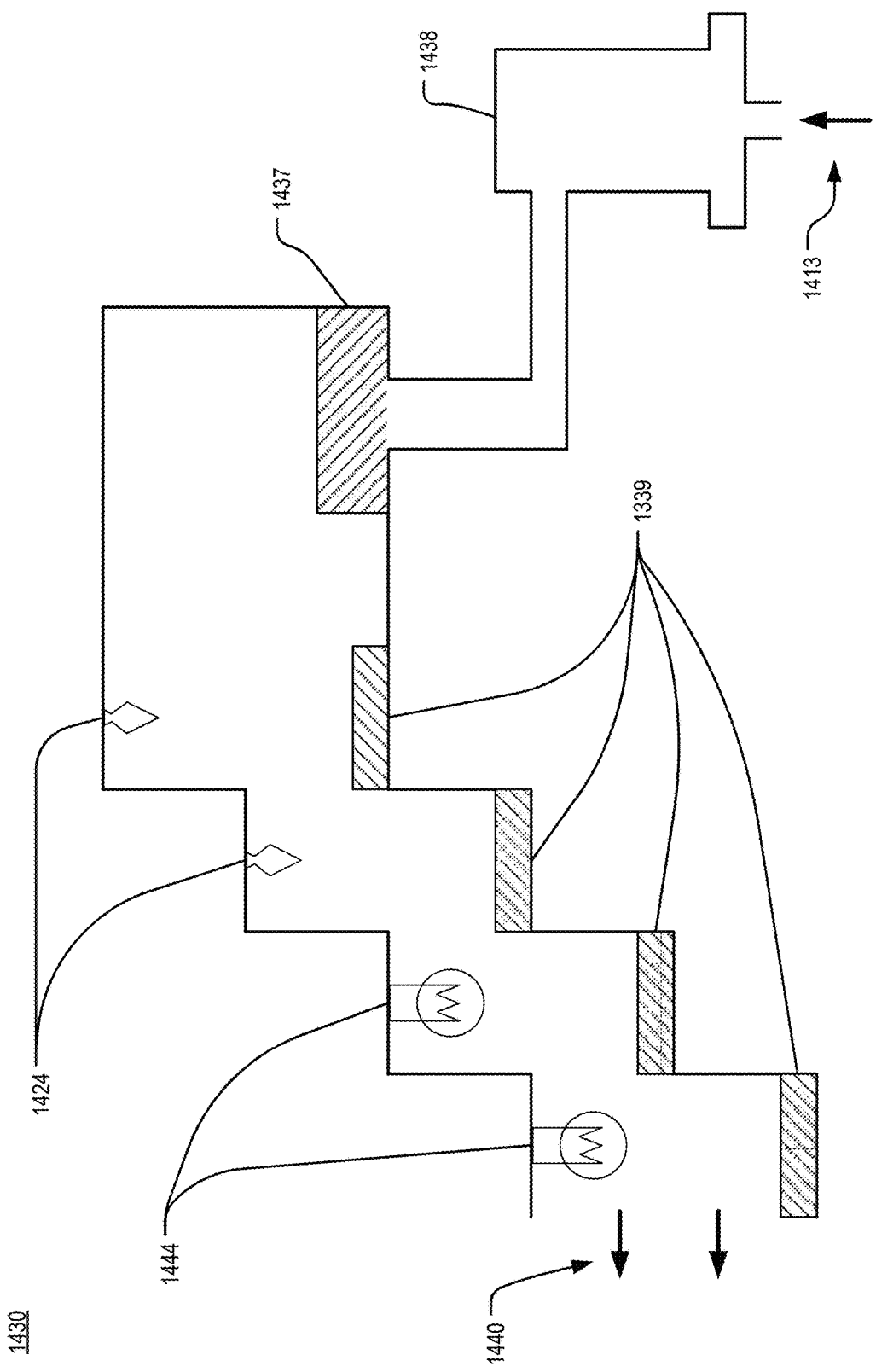
FIG. 14 is a schematic of a dehumidification subsystem, according to an exemplary embodiment of the present disclosure.

In another embodiment of the present disclosure, the sprinklers and cooling coils, described above, can be combined in order to reduce system energy consumption. FIG. 14 is a schematic of a dehumidification subsystem, substantially similar to the dehumidification subsystem of FIG. 12 and FIG. 13, but employing a combination of cooling coils and sprinklers. According to an exemplary embodiment of the present disclosure, humidified air 1413 from a humidification subsystem is directed to a compressor 1438 that provides the humidified air 1413 to the dehumidification subsystem 1430 at a high temperature and with a relative humidity of 1. The compressed, humidified air 1413 then passes through a bubble dehumidifier 1437, wherein the resulting temperature of the humidified air 1413 will depend on the efficacy of the bubble dehumidifier 1437. Following passage through the bubble dehumidifier 1437, the humidified air 1413 will be at a lower temperature but still capable of releasing more energy.

According to an embodiment, as the humidified air 1413 is directed through the dehumidification subsystem 1430, it is passed by a combination of one or more sprinklers 1424 and one or more cooling coils 1444. Each of the one or more sprinklers 1424 and one or more cooling coils 1344 is positioned above one of one or more desiccant trays 1439. Each of the one or more sprinklers 1424 can disperse droplets of salts into the compressed humidified air 1413 exiting from the bubble dehumidifier 1437. As the humidified air 1413 mixes with the salt droplets from the one or more sprinklers 1424 and condenses in the dehumidification subsystem, resulting water is collected in the one or more desiccant trays 1439. Each of the one or more sprinklers 1424 can be individually controlled via control valves to modify salt concentration. The three most common ions used for mineralizing drinking water, sodium, magnesium, and calcium, are depicted in FIG. 11. Refrigerant, used to maintain a cooled temperature, flows through each of the one or more cooling coils 1444 at a known rate and temperature. The humidified air 1413 passed over the one or more cooling coils 1444 experiences a decrease in temperature and energy. Subsequent loss of moisture from the humidified air 1413 falls into to the one or more desiccant trays 1439 positioned below.

According to an embodiment, each of the one or more desiccant trays 1439 can be individually controlled via control valves in order to control the salt concentration in each.

Following condensation within the bubble dehumidifier 1437 and via the one or more sprinklers 1424 and the one or more cooling coils 1444 via the one or more desiccant trays 1439, the resulting cool, humidified air 1440 can be directed to a passive condenser. The concentrated salt solution derived from the one or more cooling coils 1444 and the one or more sprinklers 1424 via the one or more desiccant trays 1439 can be combined with a pure water reservoir derived from the bubble dehumidifier 1437 to form a drinking water reservoir. In an embodiment, the flow of salt solutions to each of one or more desiccant trays 1439 and each of the one or more sprinklers 1424 can be connected via control valves that selectively control the volume and type of salt solution required. The salt in each of the one or more desiccant trays 1439 and each of the one or more sprinklers 1424 is determined by carefully monitoring their concentrations in the drinking water reservoir and, in turn, adjusting the initial concentrations via the control valves. The control valves can include but are not limited to solenoid actuated control valves.

According to an embodiment, the flow of refrigerant to each of the one or more cooling coils 1444 can be controlled and varied from one side of the dehumidification subsystem 1430 to the other. In an example, each of the one or more cooling coils 1444 can be set to a different flow rate of refrigerant, resulting in variable rates of condensation and, thus, variable salt concentrations in the drinking water reservoir.

According to an embodiment, one or more pumps are integrated within the dehumidification subsystem 1430 to control the flow of refrigerant to each of the one or more cooling coils 1444.

According to an embodiment, the refrigerant can include but is not limited to water, air, chlorofluorocarbons, hydrochlorofluorocarbons, and hydrofluorocarbons.

Combining sprinklers and cooling coils into a single system exploits the energy parameters of a humidified air stream and its interaction with condensing components. Humidified air that exits the bubble dehumidifier has a higher temperature, energy, and humidity than humidified air that exits the dehumidification subsystem as cooled humidified air. For this reason, the parameters required to extract moisture from the humidified air stream become different at each point in the dehumidification subsystem. In an example, while sprinklers are appropriate as a humidified air stream exits a bubble dehumidifier, cooling coils become appropriate as the humidified air stream passes through the dehumidification subsystem and loses energy and, thus, decreases in temperature. By positioning cooling coils at the end of the dehumidification subsystem, it becomes possible to further condense the humidified air by providing a relatively cooler surface against which to cool the air stream.

Figure 15:
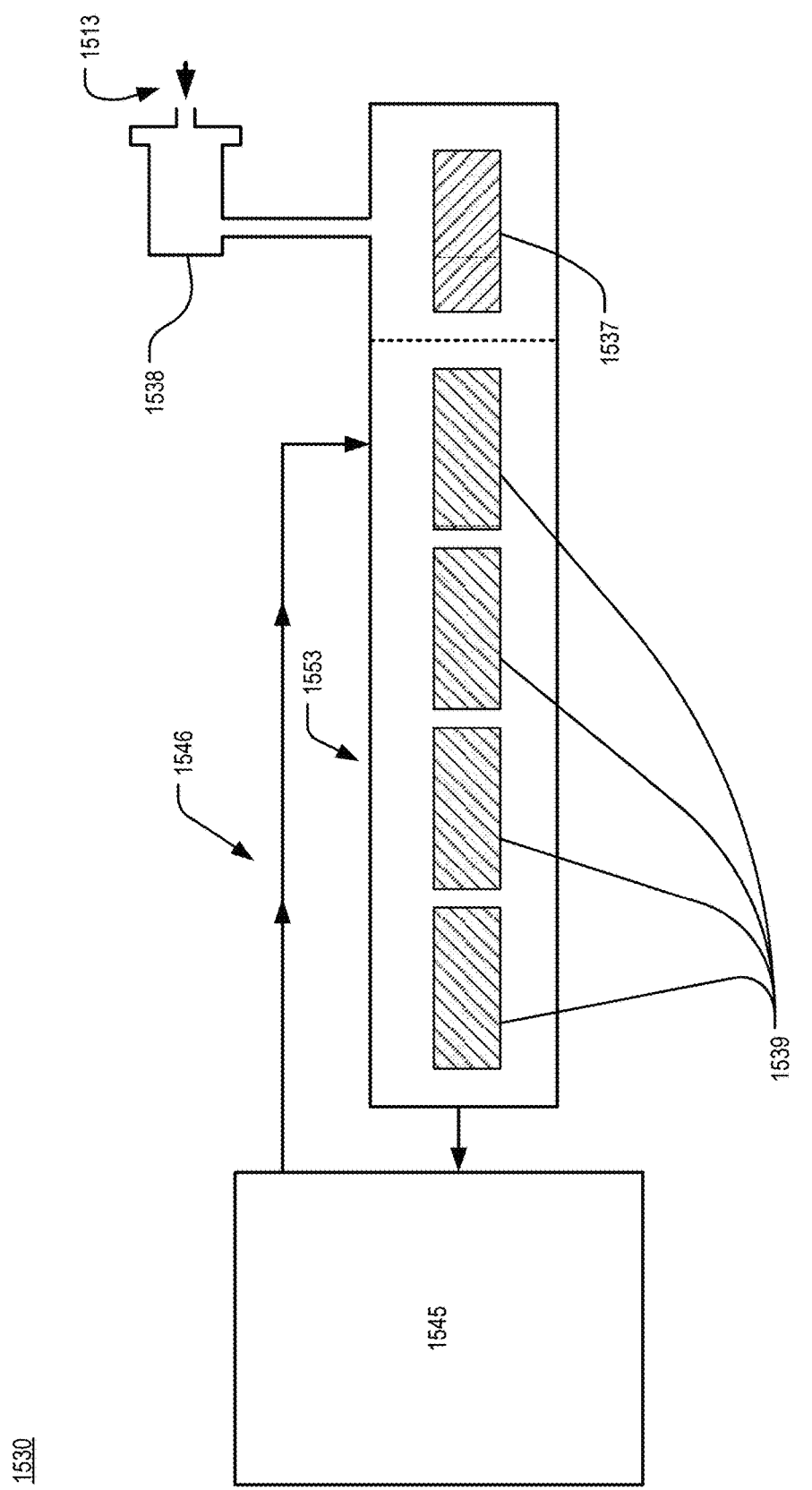
FIG. 15 is a schematic of a dehumidification subsystem, according to an exemplary embodiment of the present disclosure.

According to an embodiment, the cool air obtained at the end of the dehumidification subsystem of FIG. 12, FIG. 13, and FIG. 14 can be further utilized in HVAC systems or in large, open air cycles. In an example, the HVAC system can be further modified such that dehumidification may be also be performed. FIG. 15 is a schematic of a dehumidification subsystem, substantially similar to the dehumidification subsystems describe above, wherein cooling and dehumidification are coupled processes. According to an exemplary embodiment of the present disclosure, humidified air 1513 from a humidification subsystem is directed to a compressor 1538 that provides the humidified air 1513 to the dehumidification subsystem 1530 at a high temperature and with a relative humidity of 1. The compressed, humidified air 1513 then passes through a bubble dehumidifier 1537, wherein the resulting temperature of the humidified air 1513 will depend on the efficacy of the bubble dehumidifier 1537. Following passage through the bubble dehumidifier 1537, the humidified air 1513 will be at a lower temperature but still capable of releasing more energy. The humidified air 1513 then enters a desiccant chamber 1553 with one or more desiccant trays 1539. Upon exiting the desiccant chamber 1553, the cooled humidified air provides cooling to an air conditioned room 1545.

While desiccants, as described, are used to dehumidify air in HVAC systems, it is often an energy intensive process to regenerate the desiccant after dehumidification. In an embodiment, conditioned air from the air conditioned room 1545 can be pumped 1546 back to the desiccant chamber 1553. Based on the location in the desiccant chamber 1553 at which the conditioned air 1546 is delivered, varying levels of specific and relative humidity can be controlled within the air conditioned room 1545.

Figure 16:
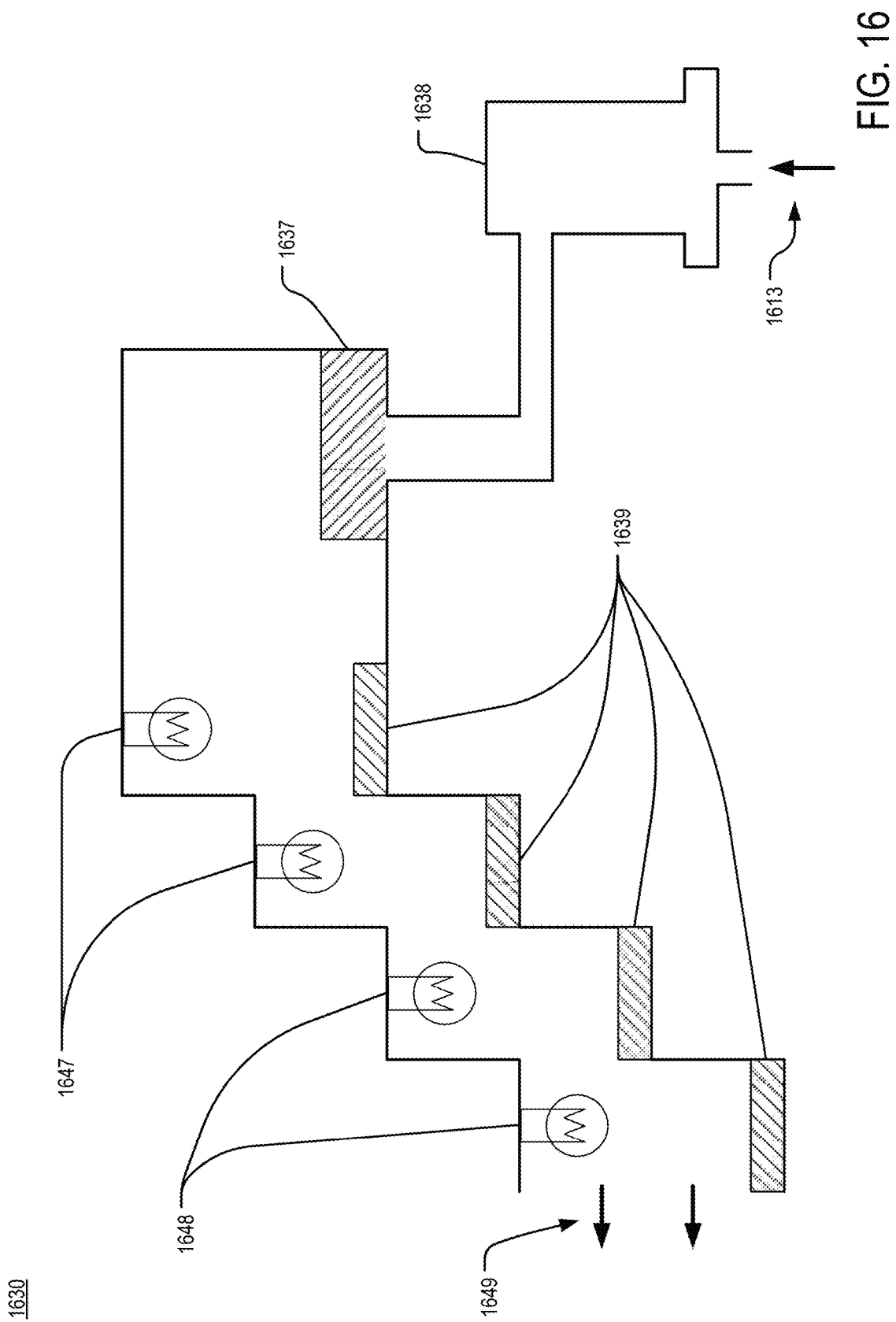
FIG. 16 is a schematic of a dehumidification subsystem, according to an exemplary embodiment of the present disclosure.

According to an embodiment, the system can also be used as a source of heating in the winter. FIG. 16 is a schematic of a dehumidification subsystem, substantially similar to the dehumidification subsystem of FIG. 12, FIG. 13, and FIG. 14, but employing a combination of heat exchangers, including cooling coils and heating coils. According to an exemplary embodiment of the present disclosure, humidified air 1613 from a humidification subsystem is directed to a compressor 1638 that provides the humidified air 1613 to the dehumidification subsystem 1630 at a high temperature and with a relative humidity of 1. The compressed, humidified air 1613 then passes through a bubble dehumidifier 1637, wherein the resulting temperature of the humidified air 1613 will depend on the efficacy of the bubble dehumidifier 1637. Following passage through the bubble dehumidifier 1637, the humidified air 1613 will be at a lower temperature but still capable of releasing more energy.

According to an embodiment, as the humidified air 1613 is directed through the dehumidification subsystem 1630, it is passed by a combination of one or more cooling coils 1647 and one or more heating coils 1648. Each of the one or more cooling coils 1647 and one or more heating coils 1648 is positioned above one of one or more desiccant trays 1639. Refrigerant, used to maintain a cooled temperature, flows through each of the one or more cooling coils 1647 at a known rate and temperature. The humidified air 1613 passed over the one or more cooling coils 1644 experiences a decrease in temperature and energy. Subsequent loss of moisture from the humidified air 1613 falls into to the one or more desiccant trays 1639 positioned below.

According to an embodiment, as the humidified air 1613 exits the bubble dehumidifier 1637, it passes, initially, by one or more cooling coils 1647, wherein the humidified air 1613 loses energy and, thus, moisture, to the one or more desiccant trays 1639 below. The one or more desiccant trays 1639 in proximity to the one or more cooling coils 1647 are supplied with salt concentrations appropriate for human consumption. Humidified air 1613 then passes one or more heating coils 1648 to increase the temperature of the humidified air 1613 at the exit 1649 of the dehumidification subsystem 1630 and bring it to a desired temperature.

Figure 17:
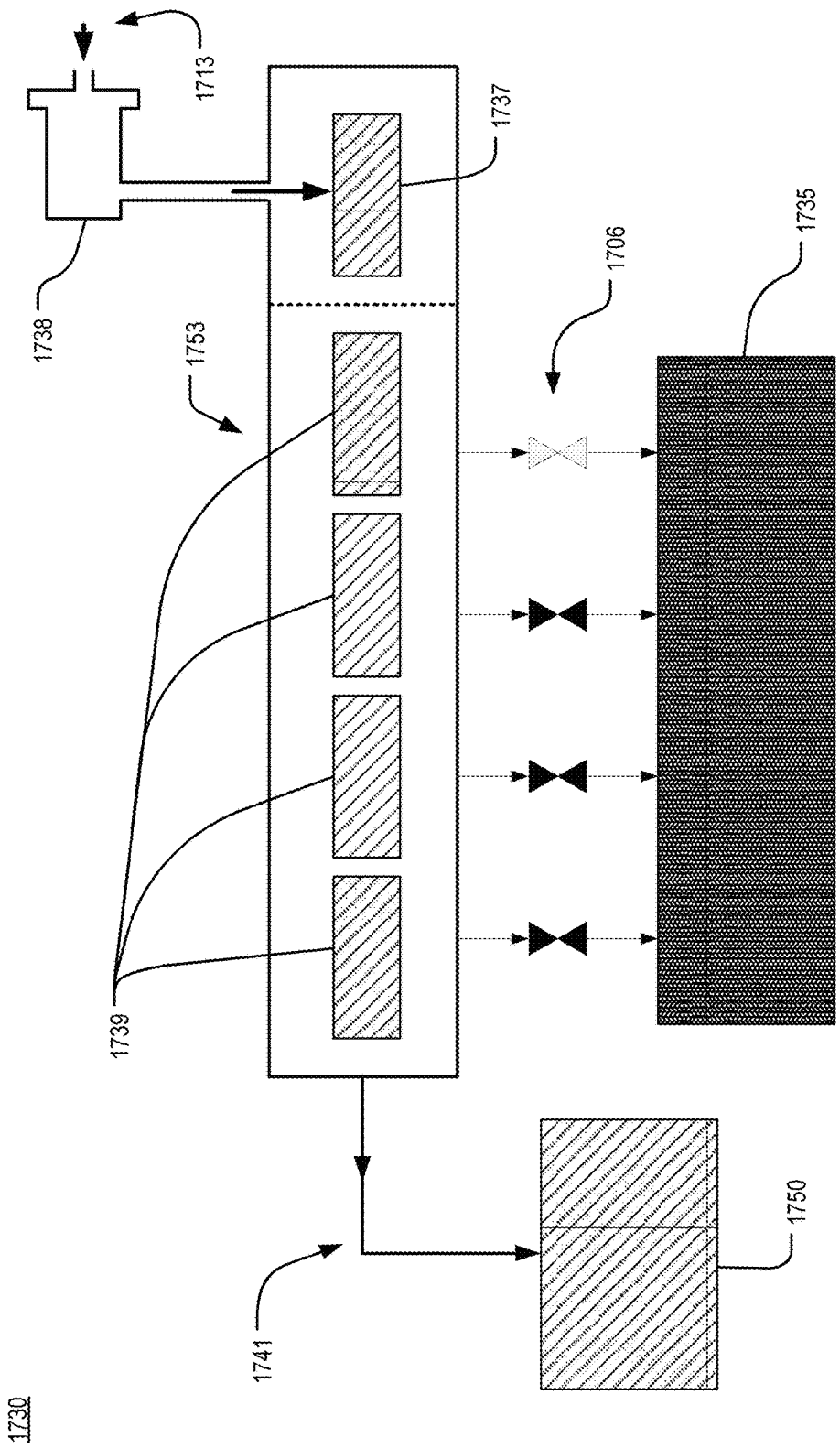
FIG. 17 is a schematic of a dehumidification subsystem, according to an exemplary embodiment of the present disclosure.

This control is critical in greenhouse environments where humid environments with controlled temperatures are often required. FIG. 17 is a schematic of a dehumidification subsystem, substantially similar to the dehumidification subsystem of FIG. 15, but with a coupling to a greenhouse 1735 and a water storage reservoir 1750. According to an exemplary embodiment of the present disclosure, humidified air 1713 from a humidification subsystem is directed to a compressor 1738 that provides the humidified air 1713 to the dehumidification subsystem 1730 at a high temperature and with a relative humidity of 1. The compressed, humidified air 1713 then passes through a bubble dehumidifier 1737, wherein the resulting temperature of the humidified air 1713 will depend on the efficacy of the bubble dehumidifier 1737. Following passage through the bubble dehumidifier 1737, the humidified air 1713 will be at a lower temperature but still capable of releasing more energy. The humidified air 1713 then enters a desiccant chamber 1753 with one or more desiccant trays 1739. Upon exiting the desiccant chamber 1753, the cooled humidified air 1713 can be pumped to a passive condenser while condensed humidified air can be delivered to a water storage reservoir 1750. Each of the one or more desiccant trays 1739 can be coupled to the greenhouse 1735 via control valve 1706. The control valve 1706 can include but is not limited to a solenoid actuated control valve.

According to the needs of the greenhouse 1735, condensate from the one or more desiccant trays 1739 can be pumped to the greenhouse 1735 in order to maintain temperature and humidity.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A humidification-dehumidification desalination system, comprising:
   a humidifier, including
      a housing having a sloped roof, a fluid inlet, and a fluid outlet,
      at least one thermal element for heating a fluid to be purified arranged within the housing, the at least one thermal element having a surface sloped at a pre-determined angle, and
      at least one fluid tray disposed within the housing, the at least one fluid tray being configured to contain the fluid to be purified and having a floor incorporating a perforated plate therein, wherein the perforated plate is in fluid communication with an air supply; and
   a dehumidifier, wherein
   the surface of the at least one thermal element, sloped at the pre-determined angle, is optically aligned with at least one solar energy concentrator,
   the fluid inlet is arranged in order to introduce the fluid to be purified to the at least one thermal element, and
   the at least one thermal element is arranged in order to introduce the fluid to be purified to the at least one fluid tray at a pre-determined temperature, the pre-determined temperature of the fluid to be purified being above an initial temperature of the fluid to be purified.

2. The humidification-dehumidification desalination system according to claim 1, wherein the at least one thermal element includes one or more heat absorbing pipes, one or more heat absorbing plates, one or more thermal energy storage units, or a combination thereof.

3. The humidification-dehumidification desalination system according to claim 1, wherein the at least one thermal element includes a thermal energy storage unit, the thermal energy storage unit including a phase change material.

4. The humidification-dehumidification desalination system according to claim 3, wherein the thermal energy storage unit includes a thermal conductor embedded within the phase change material.

5. The humidification-dehumidification desalination system according to claim 4, wherein the thermal conductor is a metallic mesh.

6. The humidification-dehumidification desalination system according to claim 1, wherein the at least one thermal element includes a heat absorbing plate and one or more levees are disposed on a surface of the heat absorbing plate.

7. The humidification-dehumidification desalination system according to claim 6, wherein the one or more levees are of a cross-sectional shape including a rectangle, a hemisphere, a sphere, a triangle, a square, or a combination thereof.

8. The humidification-dehumidification desalination system according to claim 6, wherein the one or more levees are discontinuous across a dimension of the surface of the heat absorbing plate.

9. The humidification-dehumidification desalination system according to claim 1, wherein the at least one solar energy concentrator is a Fresnel lens canopy.

10. The humidification-dehumidification desalination system according to claim 1, wherein the at least one thermal element is adjacent the at least one fluid tray, the at least one thermal element being arranged in order to passively introduce the fluid to be purified to the at least one fluid tray.

11. A humidification-dehumidification desalination system, comprising:
a humidifier, including
a housing having a sloped roof, a fluid inlet, and a fluid outlet,
a plurality of stepped thermal elements for heating a fluid to be purified arranged within the housing, each of the plurality of stepped thermal elements having a surface sloped at a pre-determined angle, and
a plurality of stepped fluid trays disposed within the housing, the plurality of stepped fluid trays being configured to contain the fluid to be purified and having a floor incorporating a perforated plate therein, wherein the perforated plate is in fluid communication with an air supply; and
a dehumidifier, wherein
the surface of each of the plurality of stepped thermal elements, sloped at the pre-determined angle, is optically aligned with at least one solar energy concentrator,
the fluid inlet is arranged in order to introduce the fluid to be purified to a first thermal element of the plurality of stepped thermal elements,
each of the plurality of stepped thermal elements is arranged in order to introduce the fluid to be purified to a respective one of the plurality of stepped fluid trays at a pre-determined temperature, the pre-determined temperature of the fluid to be purified being above an initial temperature of the fluid to be purified, and
the plurality of stepped thermal elements and the plurality of stepped fluid trays are alternately arranged from an uppermost thermal element to a lowermost fluid tray, each lower thermal element or fluid tray receiving spillover from a thermal element or fluid tray immediately above.

12. The humidification-dehumidification desalination system according to claim 11, wherein each of the plurality of stepped thermal elements includes one or more heat absorbing pipes, one or more heat absorbing plates, one or more thermal energy storage units, or a combination thereof.

13. The humidification-dehumidification desalination system according to claim 11, wherein one or more of the plurality of thermal elements includes a thermal energy storage unit, each thermal energy storage unit including a phase change material.

14. The humidification-dehumidification desalination system according to claim 13, wherein each thermal energy storage unit includes a thermal conductor embedded within the phase change material.

15. The humidification-dehumidification desalination system according to claim 14, wherein the thermal conductor is a metallic mesh.

16. The humidification-dehumidification desalination system according to claim 11, wherein one or more of the plurality of stepped thermal elements is a heat absorbing plate and one or more levees are disposed on a surface of the heat absorbing plate.

17. The humidification-dehumidification desalination system according to claim 16, wherein the one or more levees are of a cross-sectional shape including a rectangle, a hemisphere, a sphere, a triangle, a square, or a combination thereof.

18. The humidification-dehumidification desalination system according to claim 16, wherein the one or more levees are discontinuous across a dimension of the surface of the heat absorbing plate.

19. The humidification-dehumidification desalination system according to claim 11, wherein the at least one solar energy concentrator is a Fresnel lens canopy.

20. A humidification-dehumidification desalination system, comprising:
a humidifier, including
a housing having a fluid inlet,
at least one thermal element arranged within the housing, and
at least one fluid tray disposed within the housing, the at least one fluid tray being configured to contain a fluid and having a floor incorporating a perforated plate therein, wherein the perforated plate is in fluid communication with an air supply; and
a dehumidifier, wherein
the at least one thermal element is optically aligned with at least one solar energy concentrator,
the fluid inlet is arranged in order to introduce the fluid to the at least one thermal element, and
the at least one thermal element is arranged in order to introduce the fluid to the at least one fluid tray at a pre-determined temperature, the pre-determined temperature of the fluid being above an initial temperature of the fluid.

* * * * *